(12) United States Patent
Mathsyendranath et al.

(10) Patent No.: US 10,339,629 B2
(45) Date of Patent: Jul. 2, 2019

(54) METHOD FOR PROVIDING INDICATION IN MULTI-DIMENSIONAL MEDIA IN ELECTRONIC DEVICE

(71) Applicant: Samsung Electronics Co., Ltd., Suwon-si, Gyeonggi-do (KR)

(72) Inventors: Raghavendra Kalose Mathsyendranath, Bengaluru (IN); Alok Shankarlal Shukla, Bengaluru (IN); Pradeep Choudhary, Bengaluru (IN); Karthik Narayanan, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 189 days.

(21) Appl. No.: 15/288,370

(22) Filed: Oct. 7, 2016

(65) Prior Publication Data
US 2017/0103535 A1    Apr. 13, 2017

(30) Foreign Application Priority Data

Oct. 9, 2015   (IN) ........................... 5429/CHE/2015
May 9, 2016   (IN) ........................... 5429/CHE/2015

(51) Int. Cl.
*G06T 11/00*   (2006.01)
*A63F 13/92*   (2014.01)
(Continued)

(52) U.S. Cl.
CPC ................ *G06T 3/40* (2013.01); *A63F 13/26* (2014.09); *A63F 13/537* (2014.09); *A63F 13/92* (2014.09); *G06T 11/00* (2013.01); *H04N 5/262* (2013.01)

(58) Field of Classification Search
CPC ........ A63F 13/26; A63F 13/27; A63F 13/537; A63F 13/533; A63F 13/53; A63F 13/5372; A63F 13/5375; A63F 13/5378; G06T 3/40; G06T 3/4007; G06T 3/403; G06T 11/00; G06T 11/0001; G06T 11/0003; G06T 11/0005; G06T 11/0006; G06T 11/0008; H04N 5/262; H04N 5/2621; H04N 5/2624;
(Continued)

(56) References Cited

U.S. PATENT DOCUMENTS 6,873,712 B2 *   3/2005   Shibuya ............... G06K 9/6204
                                               348/169
9,495,783 B1 *   11/2016  Samarasekera ......... G06T 11/60
(Continued)

OTHER PUBLICATIONS https://360fly.com/videos/qDmmjyVrYzKca4iL7FiC4B/, May 1, 2015.

*Primary Examiner* — Dwayne D Bost
*Assistant Examiner* — Stephen M Brinich
(74) *Attorney, Agent, or Firm* — Jefferson IP Law, LLP

(57) ABSTRACT

An electronic device and a method for automatically displaying an indication in a multi-dimensional media in the electronic device are provided. The method includes receiving the multi-dimensional media at the electronic device, displaying a first view port of the multi-dimensional media on a screen of the electronic device, detecting at least one region of interest (ROI) in the multi-dimensional media based on plurality of parameters, and displaying an indication indicating at least one second view port of the multi-dimensional media on the screen. The second view port includes at least one ROI.

20 Claims, 35 Drawing Sheets

(51) Int. Cl.
  *A63F 13/537* (2014.01)
  *G06T 3/40* (2006.01)
  *H04N 5/262* (2006.01)
  *A63F 13/26* (2014.01)

(58) Field of Classification Search
  CPC .... H04N 5/2625; H04N 5/2628; H04N 5/265;
                 H04N 5/268; H04N 5/272
  USPC .......................... 382/199, 195, 103, 118, 149
  See application file for complete search history.

(56) References Cited

U.S. PATENT DOCUMENTS

| | | | | |
|---|---|---|---|---|
| 2002/0064299 | A1* | 5/2002 | Shibuya | G06K 9/6204 |
| | | | | 382/103 |
| 2008/0007783 | A1* | 1/2008 | Terada | H04N 1/00132 |
| | | | | 358/1.18 |
| 2009/0251482 | A1* | 10/2009 | Kondo | H04N 5/2624 |
| | | | | 345/589 |
| 2012/0059720 | A1* | 3/2012 | Musabji | G01C 21/3638 |
| | | | | 705/14.58 |
| 2012/0324357 | A1* | 12/2012 | Viegers | G06F 3/0481 |
| | | | | 715/730 |
| 2013/0216092 | A1* | 8/2013 | Kalevo | H04N 5/232 |
| | | | | 382/103 |
| 2013/0293734 | A1* | 11/2013 | Fan | G06K 9/2081 |
| | | | | 348/222.1 |

* cited by examiner

METHOD FOR PROVIDING INDICATION IN MULTI-DIMENSIONAL MEDIA IN ELECTRONIC DEVICE

CROSS-REFERENCE TO RELATED APPLICATION(S)

This application claims the benefit under 35 U.S.C. § 119(e) of an Indian Provisional application filed on Oct. 9, 2015 in the Indian Patent Office and assigned Serial number 5429/CHE/2015(PS), and under 35 U.S.C. § 119(a) of an Indian patent application filed on May 9, 2016 in the Indian Patent Office and assigned Serial number 5429/CHE/2015 (CS), the entire disclosure of each of which is hereby incorporated by reference.

TECHNICAL FIELD

The present disclosure relates to data processing devices. More particularly, the present disclosure relates to a mechanism for automatically displaying an indication in a multi-dimensional media.

BACKGROUND

The feasibility of rendering a multi-dimensional media (e.g., 360 degree video, three-dimensional (3D) video, or the like) on a two-dimensional (2D) screen is increasing rapidly. A user of an electronic device may also be able to view the multi-dimensional media on the electronic device with the aid of wearable devices, such as a virtual reality (VR) device, 3D-glasses, or the like. As due to the limitation of the 2D screen, viewing area, rendering of the multi-dimensional media thereupon is limited resulting in an unpleasant user experience. Further, the user of the electronic device may have to perform manual swiping/scrolling of the 2D screen to identify the interested segment/region in the rendered multi-dimensional media.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the abovementioned problems and/or disadvantages and to provide at least the advantages described below. Accordingly, an aspect of the present disclosure is to provide a mechanism for providing an indication in a multi-dimensional media in an electronic device.

Another aspect of the present disclosure is to provide a mechanism for receiving the multi-dimensional media at the electronic device.

Another aspect of the present disclosure is to provide a mechanism for causing to display a first view port of the multi-dimensional media on a screen of the electronic device.

Another aspect of the present disclosure is to provide a mechanism for detecting at least one region of interest (ROI) in the multi-dimensional media based on one or more parameters.

Another aspect of the present disclosure is to provide a mechanism for causing, at the electronic device, to display an indication indicating one or more second view ports of the multi-dimensional media on the screen, wherein the one or more second view ports comprising the at least one ROI.

In accordance with an aspect of the present disclosure, a method for providing an indication in a multi-dimensional media in an electronic device is provided. The method includes receiving the multi-dimensional media at the electronic device, displaying a first view port of the multi-dimensional media on a screen of the electronic device, detecting at least one ROI in the multi-dimensional media based on one or more parameters, and displaying an indication indicating one or more second view ports of the multi-dimensional media on the screen, wherein the one or more second view ports comprise the at least one ROI.

In an embodiment of the present disclosure, the method further includes receiving an input to navigate from the first view port to the one or more second view ports.

In an embodiment of the present disclosure, the method further includes detecting whether a distance between the first view port and the one or more second view ports is one of being within a threshold and exceeds a threshold.

In an embodiment of the present disclosure, the method further includes causing to perform one of transition from the first view port to the one or more second view ports when the distance is within the threshold, and rendering the one or more second view ports when the distance exceeds the threshold.

In an embodiment of the present disclosure, the one or more second view ports is created by stitching at least one portion, of the multi-dimensional media, comprising the at least one ROI.

In an embodiment of the present disclosure, the at least one ROI in the one or more second view ports is automatically one of modified, arranged, and positioned based on one of a screen resolution of the electronic device, a movement of ROI, a relationship and a degree of similarity.

In an embodiment of the present disclosure, the at least one second view port, comprising the at least one ROI, is automatically marked.

In an embodiment of the present disclosure, detecting the at least one ROI in the multi-dimensional media based on the one or more parameters comprises extracting the plurality of features from the multi-dimensional media, determining the one or more parameters based on the plurality of features, wherein the one or more parameters may include a visual attention model, an audio attention model, interest model, and user defined parameters, and detecting the at least one ROI in the multi-dimensional media based on the one or more parameters.

In an embodiment of the present disclosure, the feature is at least one of face attributes, motion attributes, aesthetic attributes, saliency attributes, and audio attributes.

In an embodiment of the present disclosure, each of the detected ROI is associated with a weight computed based on the one or more parameters.

In an embodiment of the present disclosure, each of the second view port is ranked based on the weight associated with the detected ROI, wherein each of the second view port is dynamically displayed based on the rank.

In an embodiment of the present disclosure, the indication is at least one of a visual indication, an audio indication, a thumbnail comprising the at least one ROI, a symbol, an annotation, a text, and the like.

In an embodiment of the present disclosure, the first view port and the one or more second view ports is an area dynamically defined based on coordinates of the electronic device.

In an embodiment of the present disclosure, the multi-dimensional media is one of a 360 degree video, a three-dimensional (3D) video, a 3-dimensional image, a 360 panorama image, a 3-dimensional panorama image.

In accordance with another aspect of the present disclosure, an electronic device for providing an indication in a multi-dimensional media is provided. The electronic includes a memory and at least one processor, coupled to the memory, and is configured to receive the multi-dimensional media. The processor is further configured to, cause to, display a first view port of the multi-dimensional media on a screen of the electronic device, detect at least one ROI in the multi-dimensional media based on one or more parameters, and display an indication indicating one or more second view ports of the multi-dimensional media on the screen, wherein the one or more second view ports comprise the at least one ROI.

In accordance with another aspect of the present disclosure, a computer program product comprising computer executable program code recorded on a computer readable non-transitory storage medium is provided. The computer executable program code, when executed, cause the actions including receiving, at an electronic device, a multi-dimensional media. Further, the computer executable program code, when executed, control actions including displaying a first view port of the multi-dimensional media on a screen of the electronic device, detecting at least one ROI in the multi-dimensional media based on one or more parameters, and displaying an indication indicating one or more second view ports of the multi-dimensional media on the screen, wherein the one or more second view ports comprise the at least one ROI.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It is noted that non-exclusively refers to an area dynamically defined based on coordinates of the electronic device. For example, a viewport may be one or more viewing regions, in a rectangular shape, and/or defined based on rendering-device-specific coordinates such as pixels for screen coordinates in which a region of interest (ROI) may be rendered.

Figure 1A:
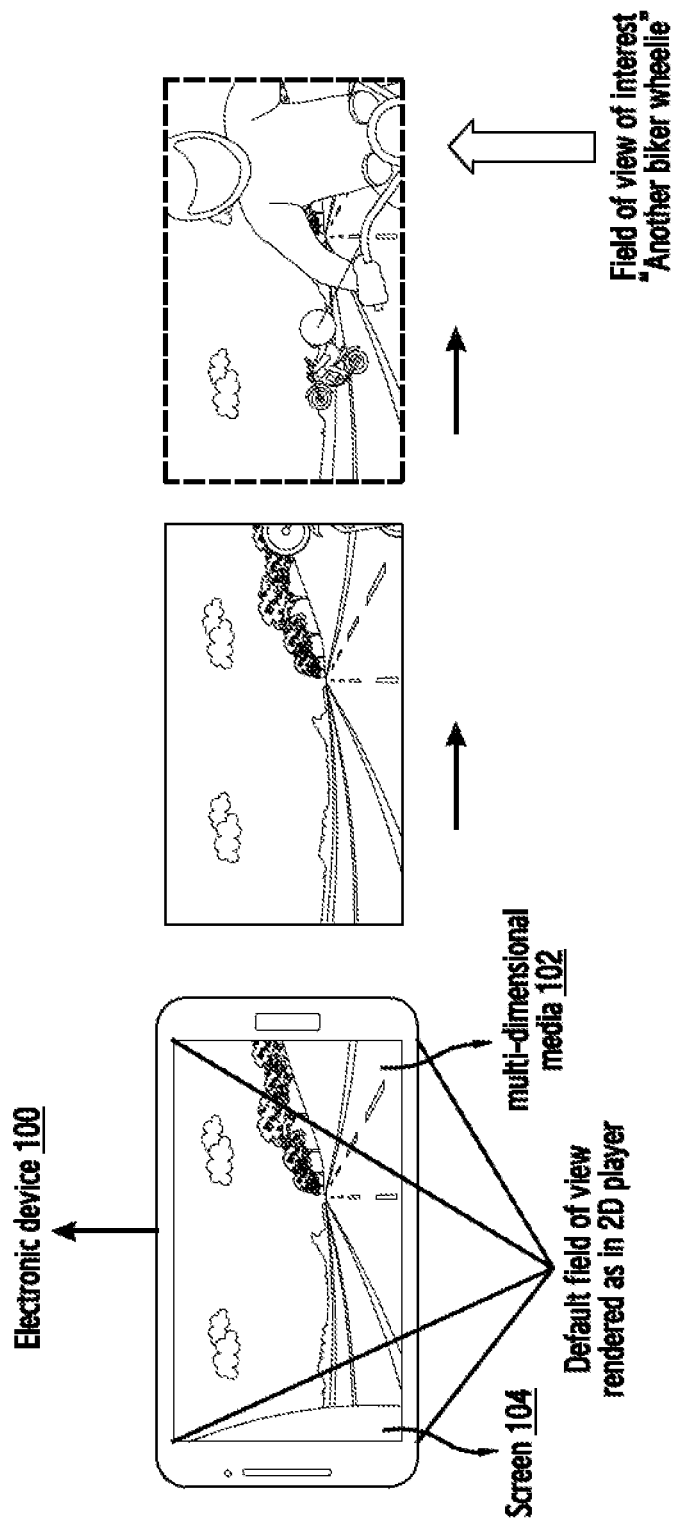
FIGS. 1A and 1B are example illustrations of an electronic device displaying a multi-dimensional media according to the related art.
Figure 1B:
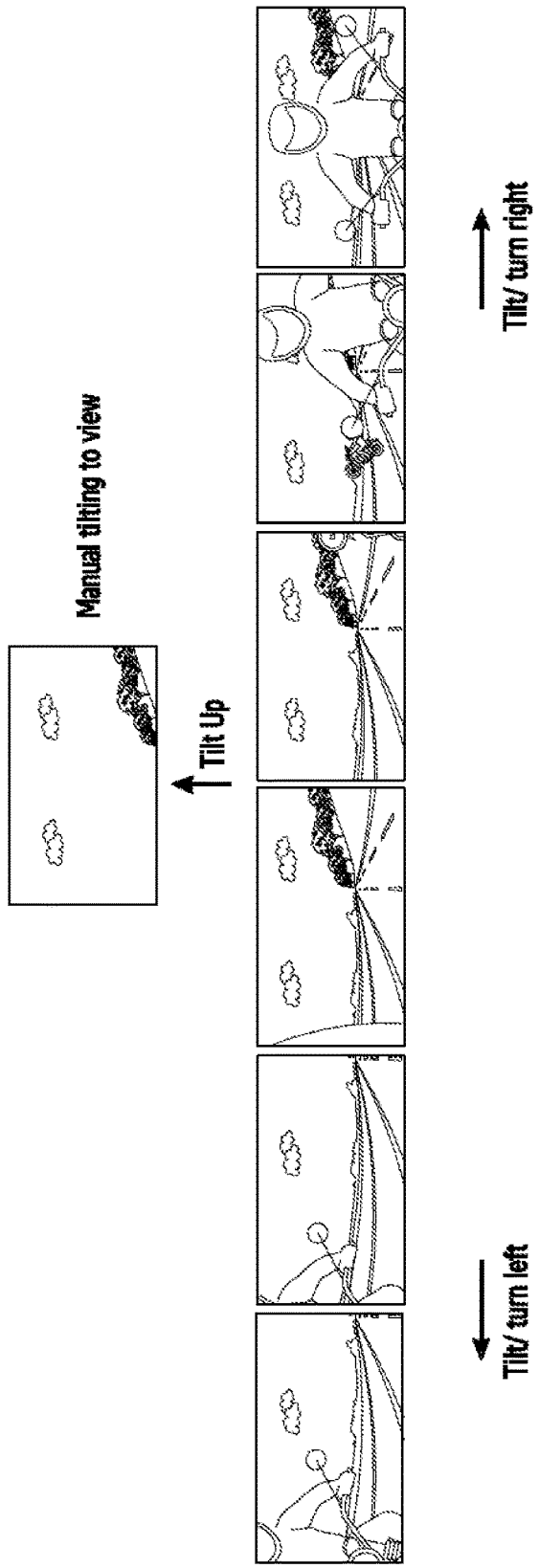

FIGS. 1A and 1B are example illustrations of an electronic device displaying a multi-dimensional media according to the related art.

Further, as illustrated in FIG. 1A, if the user of the electronic device 100 may intend to view the multi-dimensional media 102 by applying the VR device thereof, the user may have to tilt up, tilt right and tilt left, for a longer duration of time, until and unless the segment/region of interest in the multi-dimensional media 102 is identified, as shown in FIG. 1B.

Furthermore, the multi-dimensional media rendered on the 2D screen is wrapped around a sphere thereto, which may not be visually appealing to another end of the sphere (not visible to the user). For example, the 360 degree media may contain informative data or the data pertaining to the interest of the user. Hence, it is very crucial to provide an enhanced 360 degree view of the multi-dimensional media with limited manual effort(s).

The various embodiments of the present disclosure disclose a method for providing an indication in a multi-dimensional media in an electronic device. Further, the method includes receiving the multi-dimensional media at the electronic device. Further, the method includes causing to display a first view port of the multi-dimensional media on a screen of the electronic device. Further, the method includes detecting at least one ROI in the multi-dimensional media based on one or more parameters (analogous to plurality of parameters). Furthermore, the method includes causing to display an indication indicating one or more second view ports of the multi-dimensional media on the screen, wherein the one or more second view ports comprise the at least one ROI.

In an embodiment of the present disclosure, the method further includes receiving an input to navigate from the first view port to the one or more second view ports.

In an embodiment of the present disclosure, the method further includes detecting whether a distance between the first view port and the one or more second view ports is one of within a threshold and exceeds a threshold.

In an embodiment of the present disclosure, the method further includes causing to perform one of transition from the first view port to the one or more second view ports when the distance is within the threshold, and rendering the one or more second view ports when the distance exceeds the threshold.

In an embodiment of the present disclosure, the one or more second view ports is created by stitching at least one portion, of the multi-dimensional media, comprising the at least one ROI.

In an embodiment of the present disclosure, the at least one ROI in the one or more second view ports is automatically one of modified, arranged, and positioned based on one of a screen resolution of the electronic device, a movement of ROI, a relationship and a degree of similarity.

In an embodiment of the present disclosure, the one or more second view ports, comprising the at least one ROI, is automatically marked.

In an embodiment of the present disclosure, detecting the at least one ROI in the multi-dimensional media based on the one or more parameters comprises extracting the plurality of features from the multi-dimensional media, determining the one or more parameters based on the plurality of features, wherein the one or more parameters may include a visual attention model, an audio attention model, interest model, and user defined parameters, and detecting the at least one ROI in the multi-dimensional media based on the one or more parameters.

In an embodiment of the present disclosure, the feature is at least one of face attributes, motion attributes, aesthetic attributes, saliency attributes, and audio attributes.

In an embodiment of the present disclosure, each of the detected ROI is associated with a weight computed based on the one or more parameters.

In an embodiment of the present disclosure, each of the second view port is ranked based on the weight associated with the detected ROI, wherein each of the second view port is dynamically displayed based on the rank.

In an embodiment of the present disclosure, the indication is at least one of a visual indication, an audio indication, a thumbnail comprising the at least one ROI, a symbol, an annotation, a text, and the like.

In an embodiment of the present disclosure, the first view port and the one or more second view ports are an area dynamically defined based on coordinates of the electronic device.

In an embodiment of the present disclosure, the multi-dimensional media is one of a 360 degree video, a three-dimensional (3D) video, a 3D image, a 360 degree panorama image, a 3D panorama image.

Unlike the methods and systems of the related art, the proposed mechanism enhances a user view towards a multi-dimensional video, on the electronic device associated with, for example, a two-dimensional (2D) screen by automatically identifying and displaying the at least one segment comprising the ROI.

Unlike the methods and systems of the related art, the proposed mechanism provides an enhanced viewing angle of the multi-dimensional media, on the electronic device associated with, for example, a 2D screen by automatically displaying the indication, aiding the user to navigate towards the ROI.

Unlike the methods and systems of the related art, the proposed mechanism further enhances the user viewing experience of the multi-dimensional media on a 2D screen by automatically positioning (i.e., highlighting) the multi-dimensional media comprising the ROI. Therefore, limiting the manual effort involved while viewing the multi-dimensional media on the 2D screen.

Referring now to the drawings, and more particularly to FIGS. 2A to 2C, 3, 4A to 4K, 5A to 5G, 6A and 6B, 7A and 7B, 8A and 8B, 9, 10A and 10B, 11, and 12, where similar reference characters denote corresponding features consistently throughout the figures, there are shown preferred embodiments.

Figure 2A:
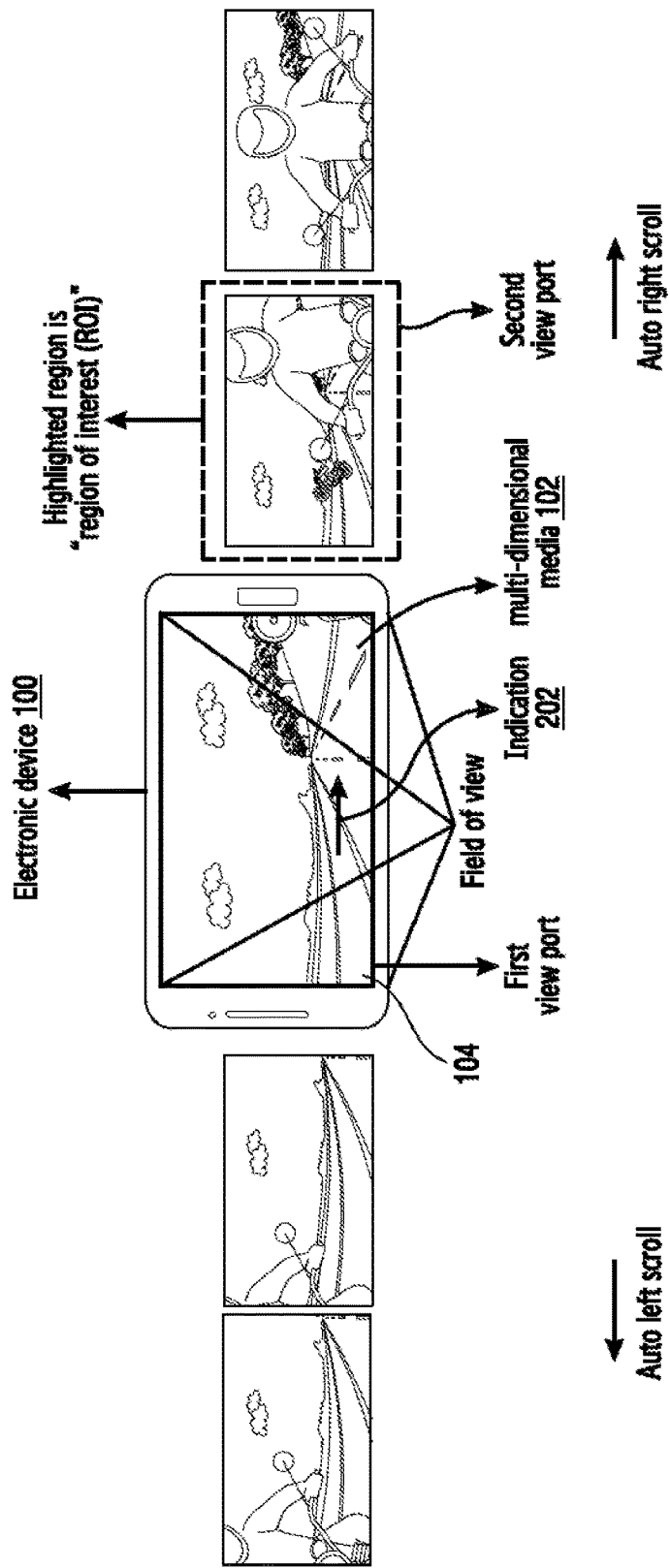
FIGS. 2A, 2B, and 2C are example illustrations of an electronic device displaying a multi-dimensional media, a first view port, one or more second view ports, and an indication according to various embodiments of the present disclosure.
Figure 2B:
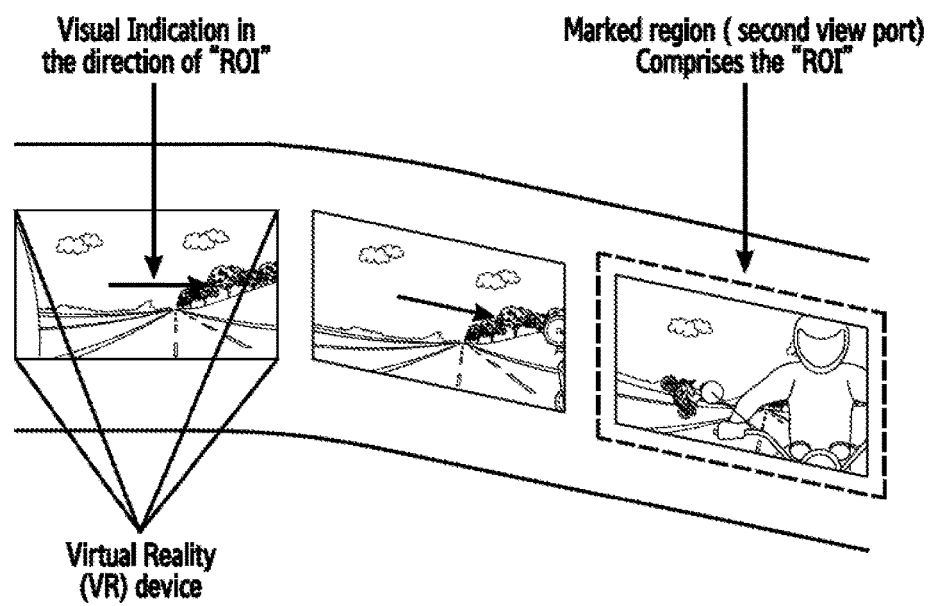
Figure 2C:
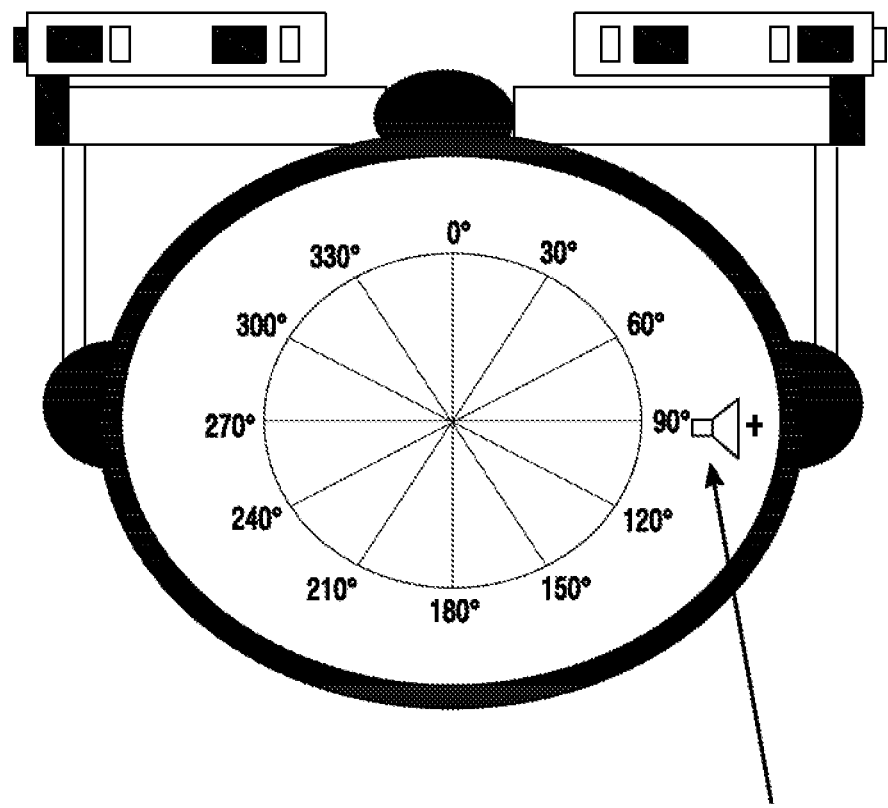

FIGS. 2A to 2C are example illustrations of an electronic device 100 displaying a multi-dimensional media 102, a first view port, one or more second view ports (hereinafter second view port), and an indication 202 according to an embodiment of the present disclosure.

Unlike the systems and methods of the related art as detailed in FIG. 1A (background) the proposed mechanism therefore includes automatically displaying the indication 202 onto a screen 104 of the electronic device 100, aiding the user in navigating towards the direction of the ROI comprising the ROI (i.e., indicating user interested segment/region) as shown in FIGS. 2A and 2B.

Unlike the systems and methods of the related art as detailed in FIG. 1B (background), the proposed mechanism automatically provides the indication 202, (for example, audio clues) aiding the user applying a virtual reality (VR) device to navigate to the second view port comprising the ROI as shown in FIG. 2C.

Unlike the systems and methods of the related art, the proposed mechanism provides tracking the ROI in the multi-dimensional media 102 and automatically creating the second view port/automatically marking (e.g., highlighting) the second view port based on the position of the ROI.

Figure 3:
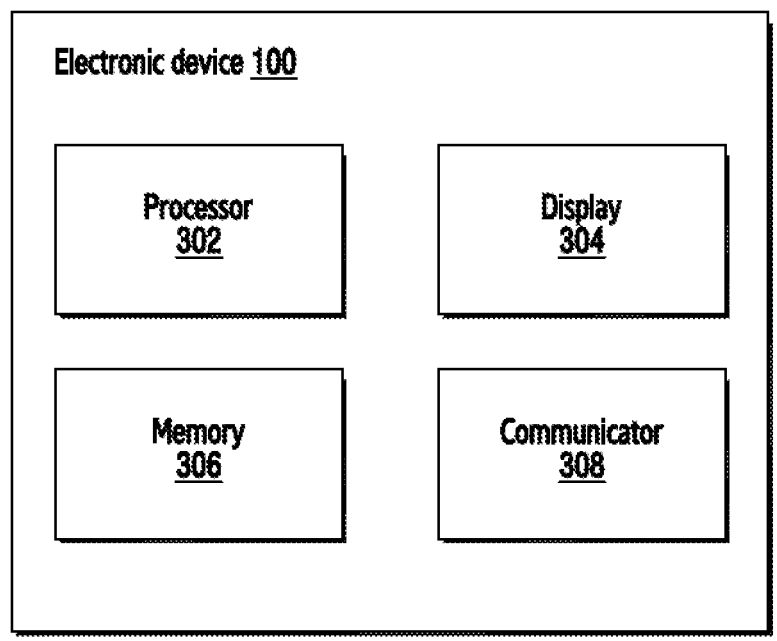
FIG. 3 shows various units of an electronic device for providing the indication onto a screen rendering a multi-dimensional media according to an embodiment of the present disclosure.

FIG. 3 shows various units of an electronic device 100 for providing an indication 202 onto the screen 104 (shown in FIG. 2A) rendering a multi-dimensional media 102 according to an embodiment of the present disclosure.

In an embodiment of the present disclosure, the electronic device 100 may include a mobile device, a head mounted display device, a virtual reality device, an augmented reality device, an optical head-mounted display, a wearable device. In an embodiment of the present disclosure, the electronic device 100 may include a laptop computer, a desktop computer, a smart television, a smart display, a notebook computer, a notebook, a tablet or a mobile device such as a mobile phone. Other forms of data processing device (similar to the electronic device 100) are within the scope of the various embodiments discussed herein. In an embodiment of the present disclosure, the electronic device 100 may include at least one processor 302 (e.g., a central processing unit (CPU), a graphics processing unit (GPU)) communicatively coupled to a memory 306 (e.g., a volatile memory and/or a non-volatile memory); the memory 306 may include storage locations configured to be addressable through the processor 302. In an embodiment, the electronic device 100 may include (or, be associated with) a display 304 (e.g., a cathode ray tube (CRT) display, a liquid crystal display (LCD)), a light-emitting diode (LED) being interfaced with the processor 302; the processor 302 may be configured to generate display data, the multi-dimensional media 102, to be rendered onto the display 304.

The processor 302 is configured to receive the multi-dimensional media 102 at the electronic device 100. The abovementioned analysis of the characteristics of the identifying the interested region/ROI in the multi-dimensional media thereon providing the indication 202 thereof may be performed through the processor 302.

Further, the processor 302 is configured to cause to display the first view port of the multi-dimensional media 102 onto the screen 104, coupled (or, be associated with) the display 304, of the electronic device 100.

In an embodiment of the present disclosure, the first view port may be a main view port, current view port, a new view port, main window of the player, or the like and the second view port may comprise the ROI.

Further, the processor 302 is configured to detect the at least one ROI in the multi-dimensional media 102 based on one or more parameters. The one or more parameters may include at least one of a visual attention model 432, an audio attention model 434, an interest model 436, and user defined parameters.

Further, the processor 302 is configured to cause to display the indication 202 indicating the second view port of the multi-dimensional media 102 onto the screen 104, wherein the second view port comprises the ROI. In an embodiment, the indication 202 may include a visual indication (e.g., one side arrow) rendered onto the screen 104 thereon directing the user of the electronic device 100 towards the second view port comprising (or, be associated with) the ROI.

In an embodiment, the processor 302 is configured to create the second view port by stitching at least one portion of the multi-dimensional media 102 comprising the ROI.

In an embodiment, the electronic device 100 may include (or, be associated with) an audio component 206 (as shown in FIG. 2B) for providing an audio functionality to the user of the electronic device 100 thereof. The audio component 206 may include (but not limited to) speakers, headphones, microphones, and the like. Further, the processor 302 is configured to control the plurality of functionalities associated with the audio component 206 thereof. In an embodiment of the present disclosure, one of the functionality from the plurality of functionalities may include providing the audio clue(s) to the user of the electronic device 100 (e.g., virtual reality (VR) device)) to navigate towards the second view port comprising the ROI. In an embodiment of the present disclosure, the audio clues may include increasing volume of the output from the audio component 206.

In an embodiment of the present disclosure, the display 304 and the audio component 206 may trigger their respective functionalities in parallel. In another embodiment, the display 304 and the audio component 206 may trigger their respective functionalities in combination thereof.

The processor 302 can be configured to automatically modify, arrange, and position the ROI, in the second view port, based on the screen 104 resolution of the electronic device 100.

The processor 302 can be configured to automatically highlight (e.g., marked) the second view port comprising the ROI. In an embodiment, the highlighting may include, for example, placing the second view port in aesthetic manner so as to enable the user, of the electronic device 100, to quickly identify the ROI as indicated by the indication 202.

Further, the memory 306 may include one or more computer-readable storage media. The memory 306 may include non-volatile storage elements. Examples of such non-volatile storage elements may include magnetic hard disks, optical discs, floppy disks, flash memories, or forms of electrically programmable read only memories (EPROMs) or electrically erasable and programmable ROMs (EEPROMs). In addition, the memory 306 may, in some examples, be considered a non-transitory storage medium. The term "non-transitory" may indicate that the storage medium is not embodied in a carrier wave or a propagated signal. However, the term "non-transitory" should not be interpreted that the memory 306 is non-movable. In certain examples, a non-transitory storage medium may store data that can, over time, change (e.g., in random access memory (RAM) or cache). A communicator 308 can be configured for communicating internally between the units and externally with the networks.

In an embodiment of the present disclosure, the first view port and the second view port are merely used for illustrative purpose and are not intended to limit the scope of the embodiments described herein. In an embodiment, the first view port may be a main view port, current view port, a new view port, main window of the player, or the like.

FIG. 3 shows units of the electronic device 100 but it is to be understood that other embodiments are not limited thereon. In other embodiments, the electronic device 100 may include fewer or greater number of units. Further, the labels or names of the units are used only for illustrative purpose and does not limit the scope of the present disclosure. One or more units can be combined together to perform same or substantially similar function in the electronic device 100.

Figure 4A:
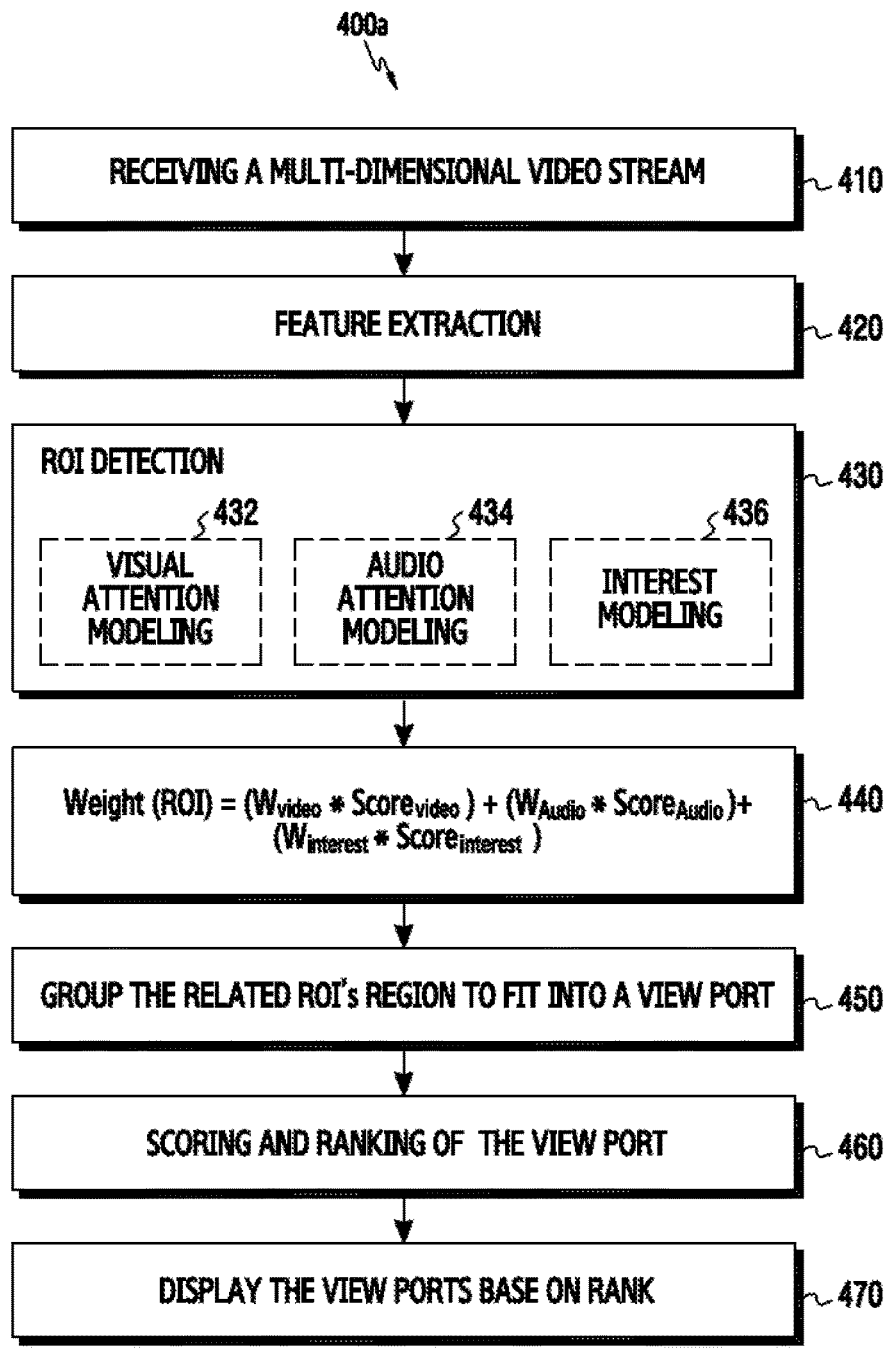
FIG. 4A is a flow diagram illustrating a method for detecting at least one region of interest (ROI) in a multi-dimensional media according to an embodiment of the present disclosure.

FIG. 4A is a flow diagram 400a illustrating a method for detecting the ROI in the multi-dimensional media 102 according to an embodiment of the present disclosure.

At operation 410, the method includes receiving the multi-dimensional media 102 (i.e., multi-dimensional media stream). In an embodiment of the present disclosure, the method allows the processor 302 to receive the multi-dimensional media 102 (i.e., multi-dimensional media stream).

Figure 4B:
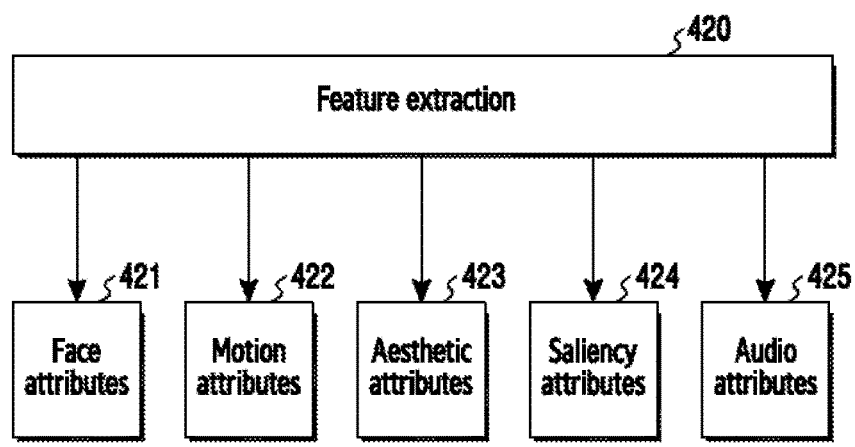
FIG. 4B is an example illustrating various operations involved in a feature extraction method for detecting at least one ROI according to an embodiment of the present disclosure.

At operation 420, the method includes extracting plurality of features associated with the multi-dimensional media 102 (as detailed in conjunction with FIG. 4B). In an embodiment of the present disclosure, the method allows the processor 302 to extract the plurality of features associated with the multi-dimensional media 102. At operation 430. The method includes detecting the ROI in the multi-dimensional media 102 using the one or more parameters. The one or more parameters may be determined based on the plurality of features extracted from the multi-dimensional media 102. The one or more parameters may include the visual attention model 432, the audio attention model 434 and the interest model 436. In an embodiment, the method allows the processor 302 to detect the ROI using the visual attention model 432, the audio attention model 434 and the interest model 436 as detailed in conjunction with FIGS. 4B to 4H.

Further, at operation 440, the method includes scoring (e.g., weighting) the ROI of the multi-dimensional media 102 by computing the weight associated with the visual attention model 432, the audio attention model 434 and the interest model 436, the computing such as: Score/Weight (ROI)=(Wvideo*Score video)+(W Audio*Score Audio)+(W interest*Score interest). In an embodiment, the method allows the processor to calculate the scores associated with the visual attention model 432, the audio attention model 434 and the interest model 436, such as: Score/Weight (ROI)=(W video*Score video)+(W Audio*Score Audio)+(W interest*Score interest).

Further, at operation 450, the method includes grouping related ROI's region, associated with the multi-dimensional media 102, to fit into the second view port (as detailed in conjunction with FIGS. 5A to 5D). In an embodiment of the present disclosure, the method allows the processor 302 to group the related ROI's region, associated with the multi-dimensional media 102, to fit into the second view port. Further, at operation 460, the method includes scoring and ranking each of the second view port comprising the ROI (as detailed in conjunction with FIGS. 5A to 5G). In an embodiment of the present disclosure, the method allows the processor 302 to score and rank the second view port comprising the ROI. Further, at operation 470, the method includes displaying each of the second view port based on the rank determined by the processor 302 (as detailed in conjunction with FIGS. 5A to 5G). In an embodiment of the present disclosure, the method allows the processor 302, coupled to the display 304, to display each of the second view port, based on the rank.

The various actions, acts, blocks, operations, or the like in the flow diagram 400a may be performed in the order presented, in a different order or simultaneously. Further, in some embodiments, some of the actions, acts, blocks, operations, or the like may be omitted, added, modified, skipped, or the like without departing from the scope of the present disclosure.

FIG. 4B is an example illustrating various operations that may be involved, but are not limited to, a feature extraction method, according to an embodiment of the present disclosure.

In an embodiment of the present disclosure, the extraction method 420 includes extracting, by the processor 302, the plurality of features associated with the multi-dimensional media 102, the plurality of features may include extracting face attributes 421 such as size, pose, location and count, motion attributes 422 such as motion vector extraction, aesthetic attributes 423 such as histogram for exposure and blurriness, saliency attributes 424 such as saliency map generation, audio attributes 425 such as mel-frequency cepstral coefficients (MFCCs), loudness and variation, directionality, zero crossing rates, sub-band powers distribution, and band periodicity (BP). The abovementioned one or more features, that are extracted, may be utilized in determining, by the processor 302, one or more characteristics of the multi-dimensional media 102.

The various actions, acts, blocks, operations, or the like in the method 400b may be performed in the order presented, in a different order or simultaneously. Further, in some embodiments of the present disclosure, some of the actions, acts, blocks, operations, or the like may be omitted, added, modified, skipped, or the like without departing from the scope of the present disclosure.

Figure 4C:
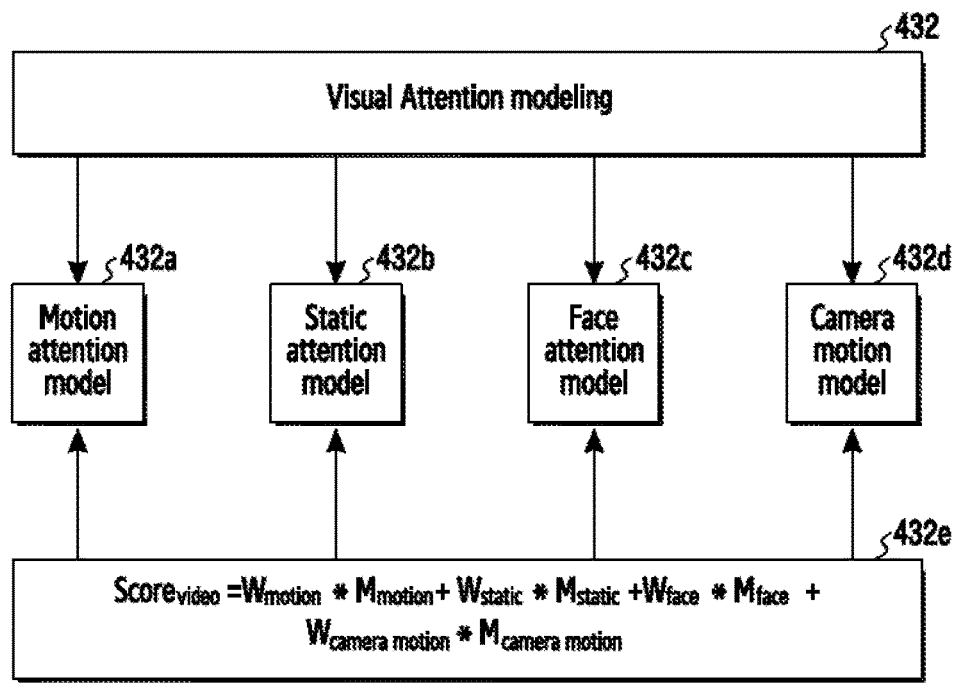
FIG. 4C is an example illustrating various operations involved in a video attention model for detecting at least one ROI according to an embodiment of the present disclosure.

FIG. 4C is an example illustrating various operations involved, but not limited to, in video attention model 432 according to an embodiment of the present disclosure.

In an embodiment, the visual attention model 432 may include one or more sub-models for determining the one or characteristics associated with the multi-dimensional media 102. The one or more sub-models may be, for example, a motion attention model 432a, a static attention model 432b, a face attention model 432c, and a camera motion model 432d. The motion attention model 432a may include computing one or more parameters associated with the multi-dimensional media 102, the one or more parameters such as intensity of motion vectors, a spatial and temporal coherency of the motion vectors, an object tracking using mean-shift and local binary patterns, a histogram differences, a sum of absolute differences (SAD), and an edge filter.

Further, the static attention model 432b may include saliency computation (i.e., mapping) of the multi-dimensional media 102. The saliency computation may include computing one or more objects associated with the multi-dimensional media 102. The one or more objects may include, for example, human activity recognition objects with salient color/contrast/texture/motion, or the like. The face attention model 432c may include computing, (for example, using photographic rules) one or parameters such as a location, a pose, a size, a count, and distribution (entropy) associated with the multi-dimensional media 102. Further, the cameral motion model 432d may include computing the motion type, direction and a velocity of the object, associated with the multi-dimensional media 102 in motion. Thus, a weight 432e of the abovementioned one or more models, associated with the visual attention model 432 may collaboratively be computed, (by applying for example, rule based fusion instructions (e.g., operation 434 shown in FIG. 4D) to score the multi-dimensional media 102, such as, Score video=Wmotion*M motion+Wstatic*Mstatic+Wface*M face+Wcamera motion*Mcamera motion, thereon rank each of the second view port comprising the ROI.

Figure 4D:
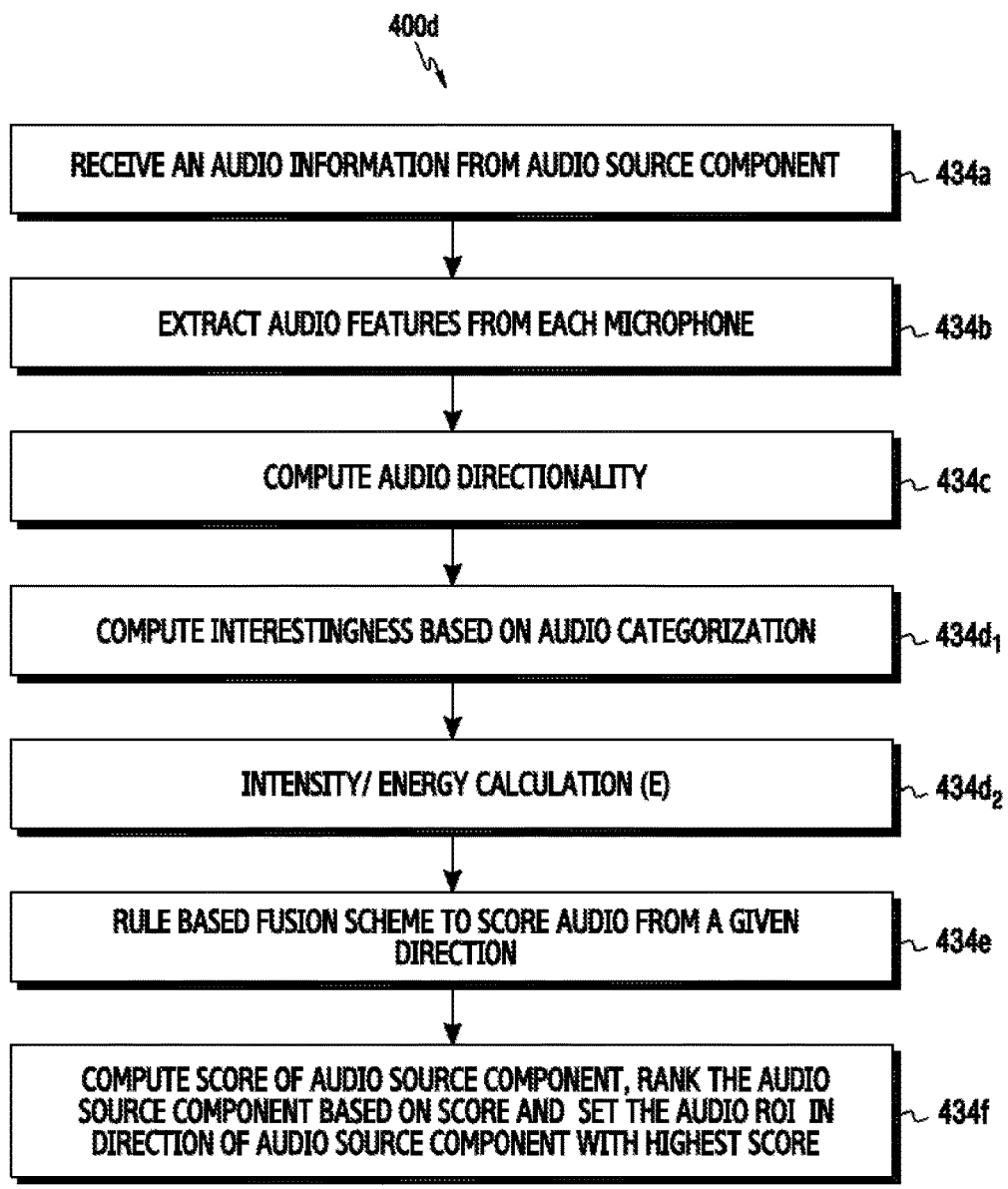
FIG. 4D is a flow diagram illustrating a method for detecting the ROI in the multi-dimensional media using the audio attention model according to an embodiment of the present disclosure.

FIG. 4D is a flow diagram 400d illustrating a method for detecting, by the processor 302, the ROI in the multi-dimensional media 102 using the audio attention model 434, coupled to the processor 302 according to an embodiment of the present disclosure.

At operation 434a, the method includes receiving audio information from the audio component 206. In an embodiment of the present disclosure, the method allows the processor 302 to receive the audio information from the audio component 206. In an embodiment of the present disclosure, the audio component 206 may include, for example, microphones, speakers, and the like. Further. At operation 434b, the method includes extracting the audio attributes from the audio component 206. In an embodiment of the present disclosure, the method allows the processor 302 to extract the audio attributes from the audio component 206. Further, at operation 434c. The method includes providing, at operation 434d1) the audio directionality by computing the interestingness (I) based on audio categorization (for example, music, speech, loud noise, applause, cheer, laughter, sudden, occasional speech, or the like) and intensity/energy calculation (E) at operation 434d2. In an embodiment of the present disclosure, the method allows the processor 302 to provide the audio directionality by computing, at operation 434f, the interestingness (I) based on audio categorization (for example, music, speech, loud noise, applause, cheer, laughter, sudden, occasional speech, or the like) and intensity/energy calculation (E). The interestingness (I) is computed by: I=a*M(i)+b*S(i), wherein M(i)={1 if (music segment), 0 if (not the music segment) and S(i)={1 if (speech segment), 0 if (not the speech segment)}, a=music Interestingness weight and b=Speech Interestingness weight. Further, the audio scoring(s) can be computed by: Score audio=p*I+q*E. Wherein, I=Interestingness, E=Energy, p=Interestingness weight and q=Energy weight. Furthermore, the processor 302 can be configured to compile the corresponding audio score of various microphones associated with the audio source, rank the various microphones based on the score henceforth, the audio ROI is set in the direction of the at least one microphone, from the various microphones, comprising the highest score as shown in FIGS. 4F and 4E.

The various actions, acts, blocks, operations, or the like in the flow diagram 400d may be performed in the order presented, in a different order or simultaneously. Further, in some embodiments, some of the actions, acts, blocks, operations, or the like may be omitted, added, modified, skipped, or the like without departing from the scope of the present disclosure.

Figure 4E:
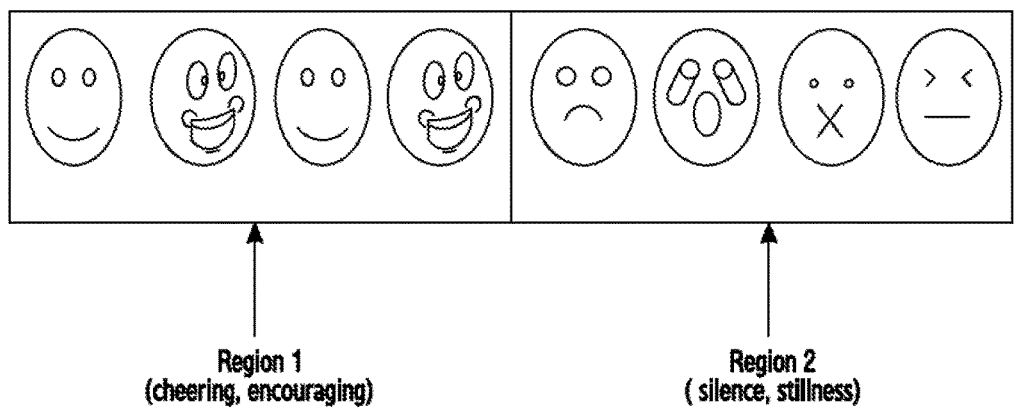
FIG. 4E is an example illustrating various operations involved for detecting the ROI based on the audio attention model according to an embodiment of the present disclosure.
Figure 4F:
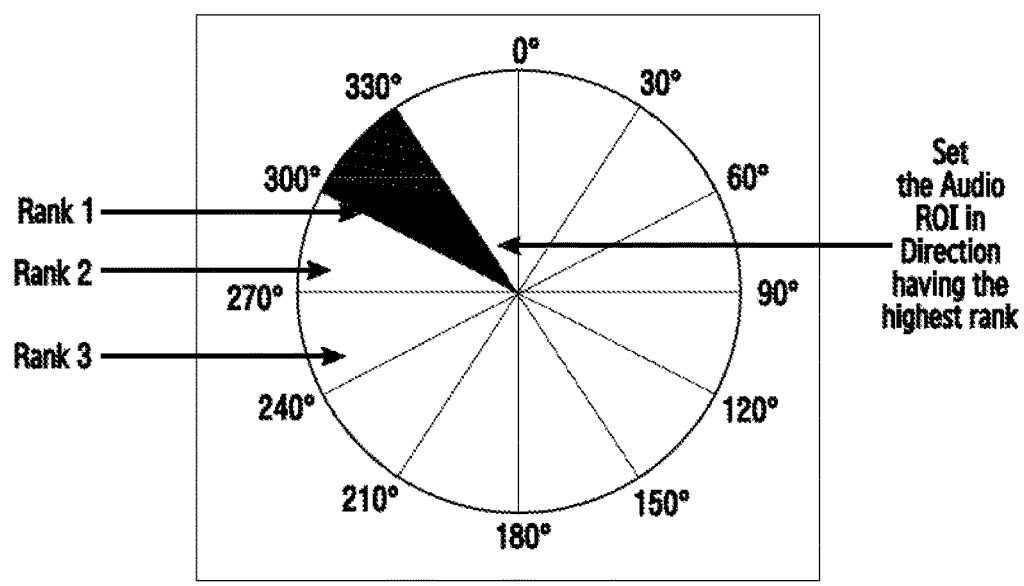
FIG. 4F is an example illustration of setting an audio ROI in the direction having the highest rank according to an embodiment of the present disclosure.

FIG. 4E is an example illustrating various operations involved for detecting the ROI based on the audio attention model 434 according to an embodiment of the present disclosure.

In an embodiment, the processor 302 may compute the multi-dimensional media 102, for example, an audio analysis of region 1 and audio analysis of region 2 thereof. As the output of the audio component 206 associated with the audio analysis of region 1 of the multi-dimensional media 102 is greater than the audio analysis of region 2 of the multi-dimensional media 102 therefore the, weight, computed by the processor 302 coupled to the audio component 206, of the audio analysis of region 1 of the multi-dimensional media 102 is set high (ranked 1). The output of the audio component 206, of the audio analysis of region 1, may include crowd cheering, a shout of encouragement, approval, congratulation, and the like. The output of the audio component 206, of the audio analysis of region 2, may include crowd silence, stillness, or the like.

The principal of this embodiment, as described in FIG. 4E may be exploited in a situation where the score computed by the video attention model 432 may be same for region 1 and region 2, for example, both region 1 and region 2 may have similar properties (texture, color contrast, object motion, face attributes). Hence, the audio attention model 434 may aid in identifying the ROI.

FIG. 4F is an example illustration of setting an audio ROI in the direction having the highest rank according to an embodiment of the present disclosure.

In an embodiment, the audio ROI can be set based on the weight computed, by the processor 302 coupled to the audio attention model 434, (as described in FIG. 4E). The audio indication in the direction of the ROI is set towards the audio analysis region 1, for example, by increasing the volume, of the multi-dimensional media 102.

Figure 4G:
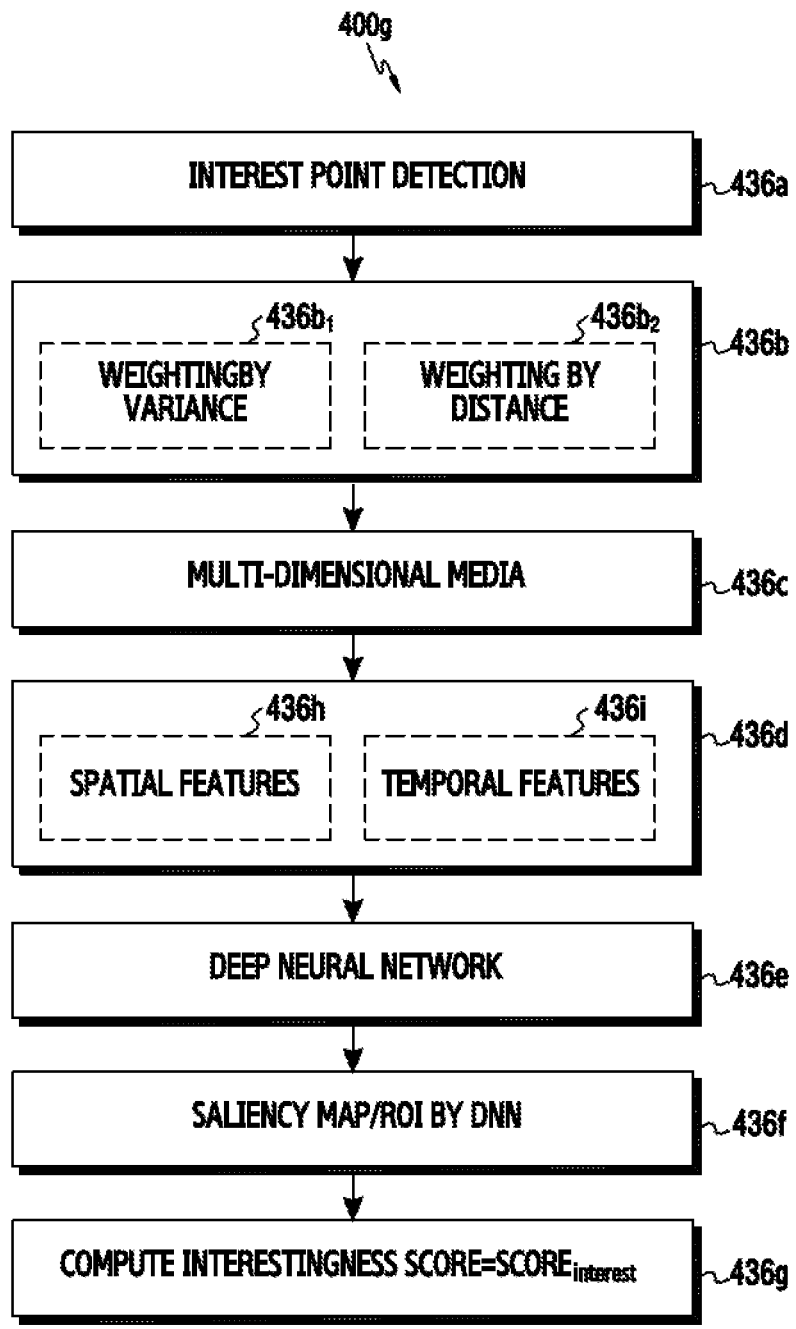
FIG. 4G is a flow diagram illustrating a method for detecting the ROI in the multi-dimensional media based on the interest model according to an embodiment of the present disclosure.

FIG. 4G is a flow diagram 400g illustrating a method for detecting the ROI in the multi-dimensional media 102 based on the interest model 436 according to an embodiment of the present disclosure.

At operation 436a, the method includes detecting the interest points associated with the multi-dimensional media 102. In an embodiment, the method allows the processor 302 to detect the interest points associated with the multi-dimensional media. In an embodiment, the interest point's detection may include a face based interest modeling and an annotation based display of scene (i.e., multi-dimensional media). In an embodiment, the face based interest modeling may include analyzing, by the processor 302, the facial attributes of the user corresponding to the electronic device 100. In an embodiment, the facial attributes may include gazing the multi-dimensional media 102, usage pattern, or the like.

In an embodiment of the present disclosure, at operation 436b1, the method includes weighting, the interest points associated with the multi-dimensional media, by variance. In an embodiment of the present disclosure, the method allows the processor 302 to weight, the interest points associated with the multi-dimensional media 102, by the variance there between. In an embodiment of the present disclosure, at operation 436b2, the method includes weighting, the interest points associated with the multi-dimensional media, by distance. In an embodiment, the method allows the processor 302 to weight, the interest points associated with the multi-dimensional media, by the distance there between.

The various actions, acts, blocks, operations (including operations 434d, 436c, 436e, 436d, 436e, 436f, 436g, 436h, and 436i shown in FIG. 4G), or the like in the flow diagram 400g may be performed in the order presented, in a different order or simultaneously. Further, in some embodiments, some of the actions, acts, blocks, operations, or the like may be omitted, added, modified, skipped, or the like without departing from the scope of the present disclosure.

Figure 4H:
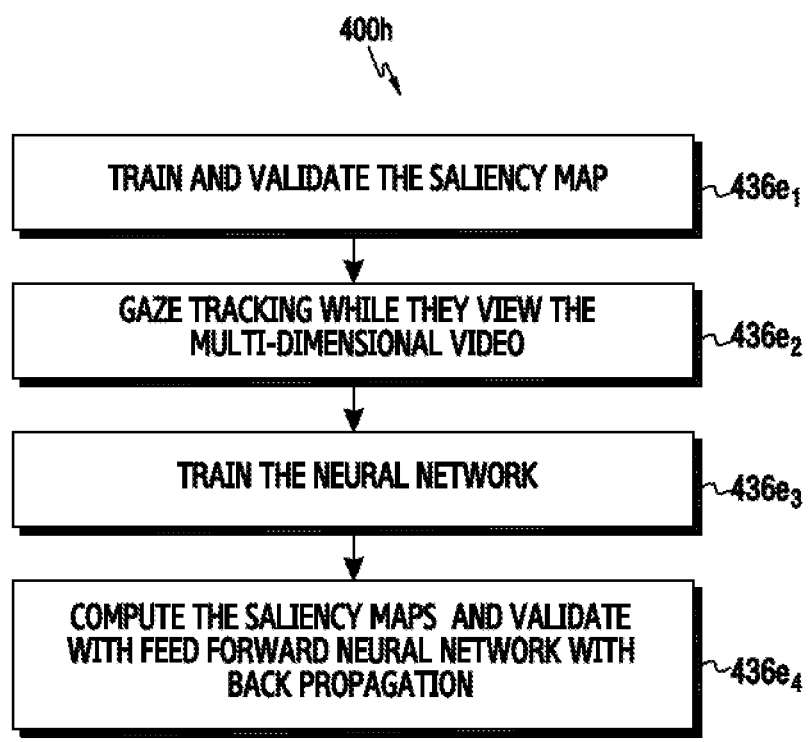
FIG. 4H is a flow diagram illustrating a method for training a deep neural network according to an embodiment of the present disclosure.

FIG. 4H is a flow diagram 400h illustrating a method for training the deep neural network according to an embodiment of the present disclosure.

At operation $436e_1$, the method may include training and validating the saliency map. In an embodiment of the present disclosure, the method allows the processor 302 to train and validate the saliency map. Further, at operation $436e_2$, the method includes gaze tracking while the user is viewing the multi-dimensional media 102. In an embodiment of the present disclosure, the method allows the processor 302 to track the gaze movement of the user while viewing the multi-dimensional media 102. Further, at operation $436e_3$, the method includes training the neural network using. In an embodiment of the present disclosure, the method allows the processor 302 to train the neural network. Further, at operation $436e_4$, the method includes computing the saliency maps and validating with feed forward neural network with back propagation. In an embodiment of the present disclosure, the method allows the processor 302 to compute the saliency maps and validate with feed forward neural network with back propagation.

The various actions, acts, blocks, operations, or the like in the flow diagram 400h may be performed in the order presented, in a different order or simultaneously. Further, in some embodiments, some of the actions, acts, blocks, operations, or the like may be omitted, added, modified, skipped, or the like without departing from the scope of the present disclosure.

Figure 4I:
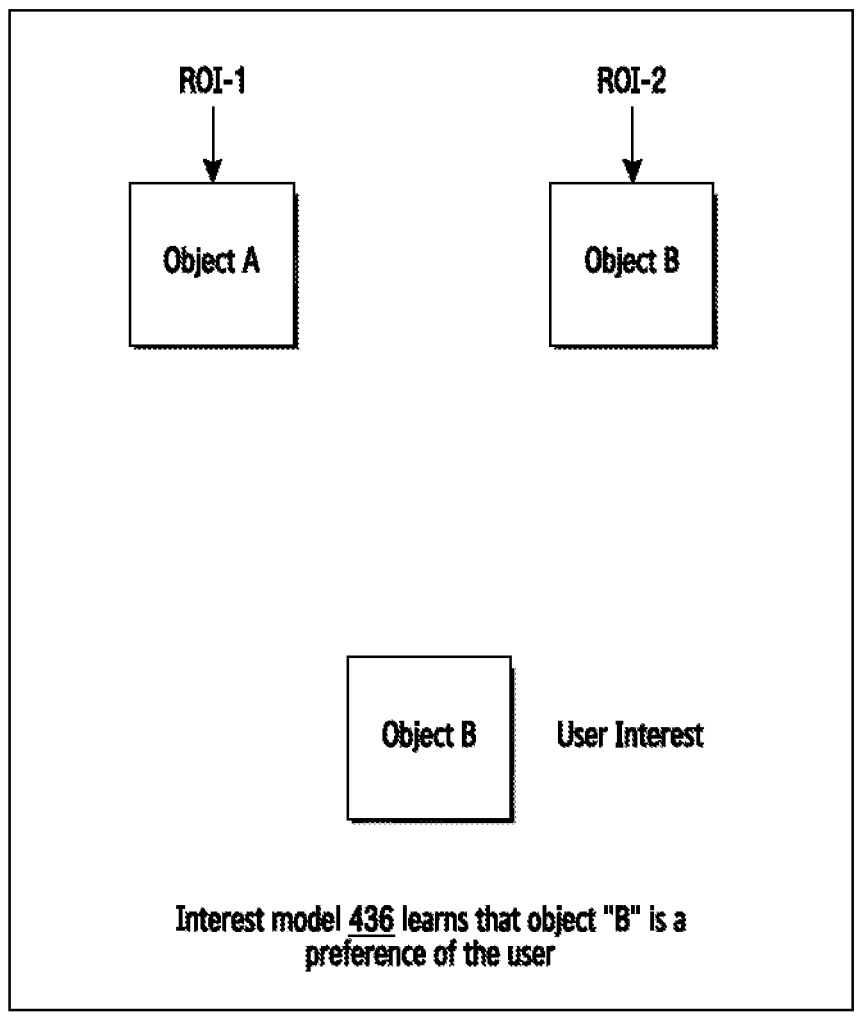
FIG. 4I is an example illustration for ranking one or more second view ports based on input provided by user interest model according to an embodiment of the present disclosure.

FIG. 4I is an example illustration for ranking the second view port based on input provided by the interest model 436 according to an embodiment of the present disclosure.

In an embodiment, the interest model 436, communicatively coupled to the processor 302, may track the user interest parameters, the parameters such as object frequently selected and viewed by the user, user viewing history stored in the memory 306, or the like. One illustrative example involves in selecting an object "B" (pertaining to the user interest) instead of selecting an object "A". The processor 302 may therefore give more weightage (highest rank/score) to the second view port which comprises the ROI similar to the object "B" in the next multi-dimensional media 102 that the user may view.

Figure 4J:
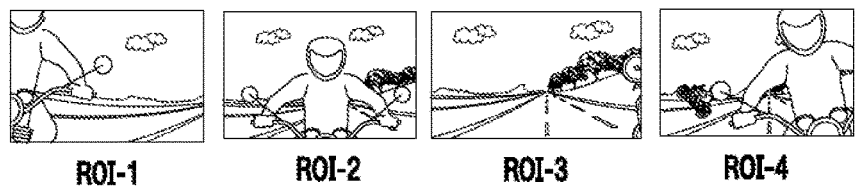
FIGS. 4J and 4K are example illustrations for ranking one or more second view ports based on visual attention model and interest model according to an embodiment of the present disclosure.
Figure 4J:
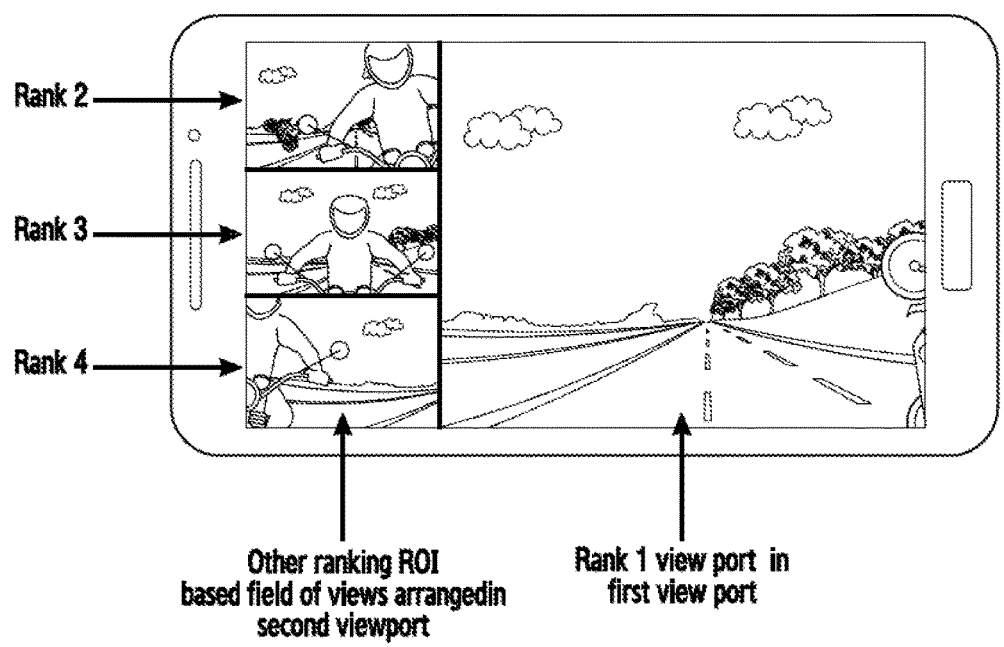
Figure 4K:
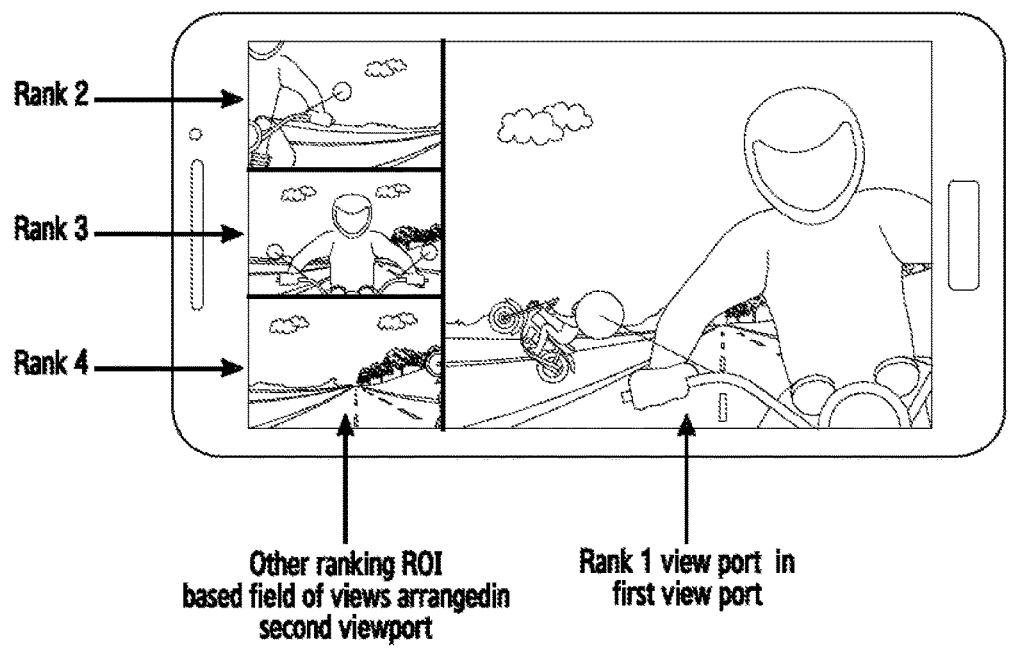

FIGS. 4J and 4K are example illustrations for ranking the second view port based on the visual attention model 432 and the interest model 436 according to an embodiment of the present disclosure.

In an embodiment, consider four input view ports associated with the multi-dimensional media 102 there each, wherein ROI-1—view port includes plants, flowers and mountains, ROI-2—view port includes plants, flowers and a part of monument, ROI-3—view port include monument (house) and ROI-4—view port includes plants and flowers. Arranging view ports based on the visual attention model 432: Each view port may, therefore, be arranged based on the rank computed on the basis of spatial and temporal saliency and other visual attributes; such as the visual based ranking. ROI-3>ROI-4>ROI-2>ROI-1, as shown in FIGS. 4J and 4K.

Further, view ports based on the visual attention model 432 and the interest model 436 may be arranged. As shown in FIGS. 4J and 4K, the interest model 436 may be configured to analyze the user interest parameters, for example, if the user is more interested in scenes with flowers and plant (ROI-4), albeit the visual attention model 432 score of ROI-4 is less than ROI-3, the first view port may still display the objects of ROI-4. The scoring herein includes: interest based ranking: ROI-4>ROI-1>ROI-2>ROI-3.

Figure 5A:
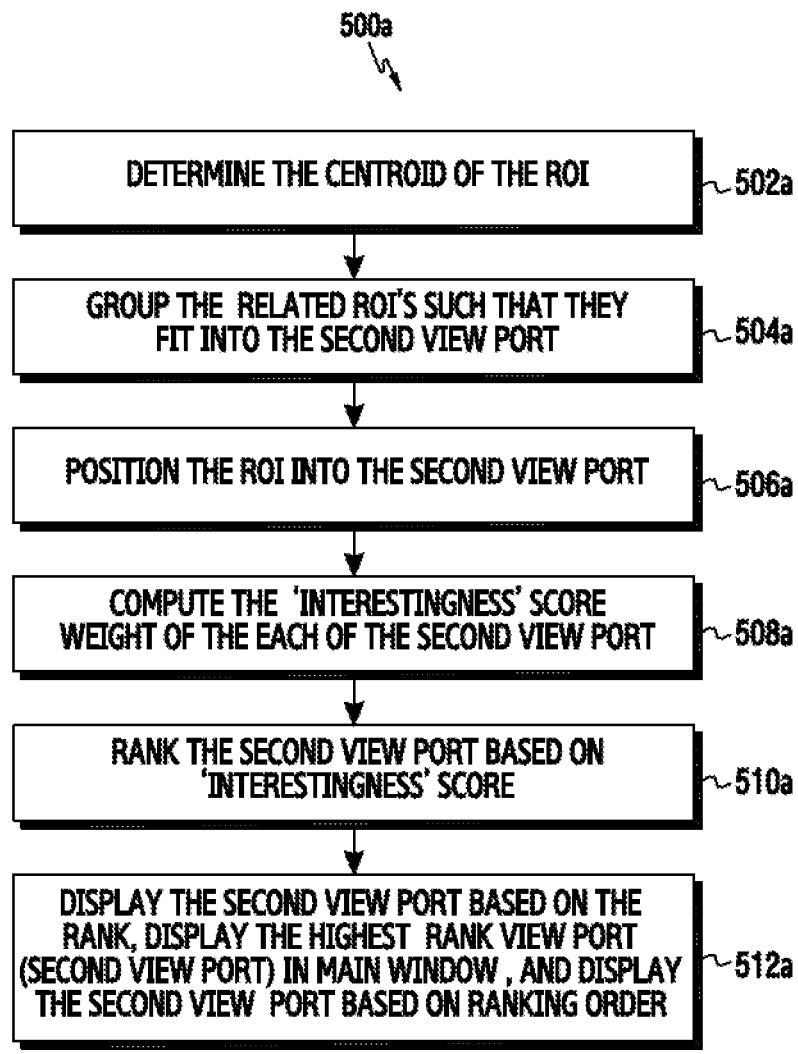
FIG. 5A is a flow diagram illustrating a method for grouping at least one ROI (related ROI's) in one or more second view ports according to an embodiment of the present disclosure.

FIG. 5A is a flow diagram 500a illustrating a method for grouping the ROI (related ROI's) in the second view port according to an embodiment of the present disclosure.

At operation 502a, the method includes determining the centroid of the ROI. In an embodiment of the present disclosure, the method allows the processor 302 to determine the centroid of the ROI. At operation 504a, the method includes grouping related ROI's such that they fit into the second view port. In an embodiment of the present disclosure, the method allows the processor 302 to group the related ROI's such that they fit into the second view port.

At operation 506a, the method includes positioning the ROI into the second view port (e.g., using photographic rules). In an embodiment, the method allows the processor to position the ROI into the second view port (e.g., using photographic rules). At operation 508a, the method includes computing the interestingness score/weight of the each of the second view port. In an embodiment, the method allows the processor 302 to compute interestingness score/weight of the each of the second view port.

Further, at operation 510a, the method includes ranking each of the second view port based on based on the computed 'Interestingness' score/weight. In an embodiment, the method allows the processor 302 to rank each of the second view port based on based on the computed 'Interestingness' score/weight.

Further, at operation 512a, the method includes one of displaying the second view port based on the rank, display the highest rank view port (second view port) in main window, and display each of the second view port based on ranking order.

The various actions, acts, blocks, operations, or the like in the flow diagram 500*a* may be performed in the order presented, in a different order or simultaneously. Further, in some embodiments of the present disclosure, some of the actions, acts, blocks, operations, or the like may be omitted, added, modified, skipped, or the like without departing from the scope of the present disclosure.

Figure 5B:
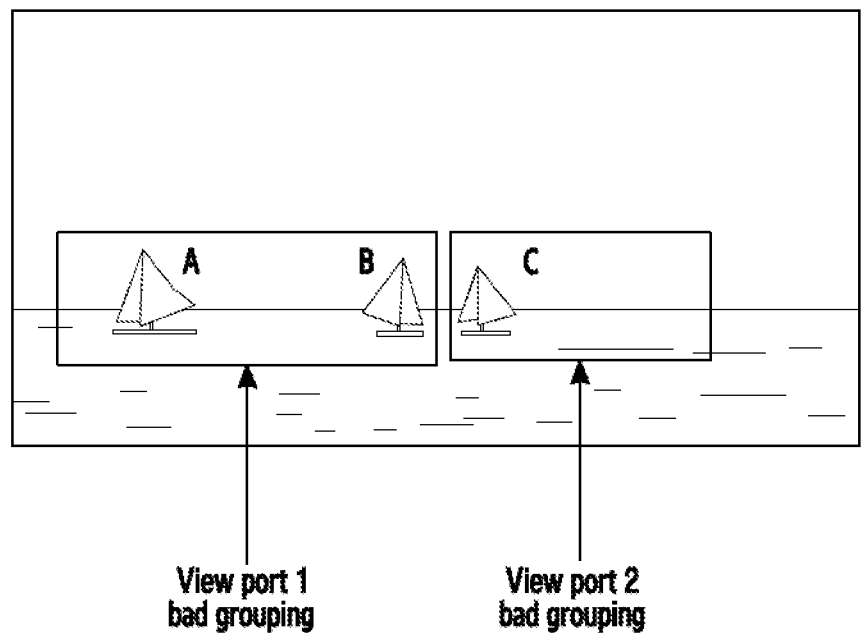
FIG. 5B is an example illustration of a bad grouping of at least one ROI (the related ROI's) in one or more second view ports according to an embodiment of the present disclosure.

FIG. 5B is an example illustration of a bad grouping of the ROI (the related ROI's) in the second view port according to an embodiment of the present disclosure.

The object "A" and the object "B" comprising the ROI are grouped in the view port 1 (analogous to the second view port), thereon, the object "C" comprising the ROI is grouped in the view port 2 (analogous to the second view port).

Figure 5C:
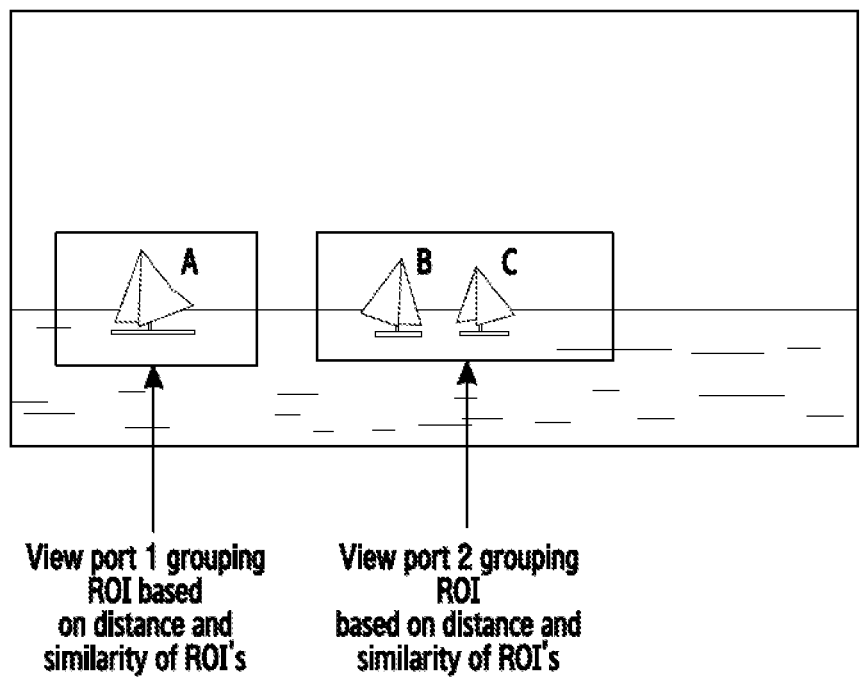
FIG. 5C is an example illustration of a good grouping at least one ROI (the related ROI's) in one or more second view ports according to an embodiment of the present disclosure.
Figure 5D:
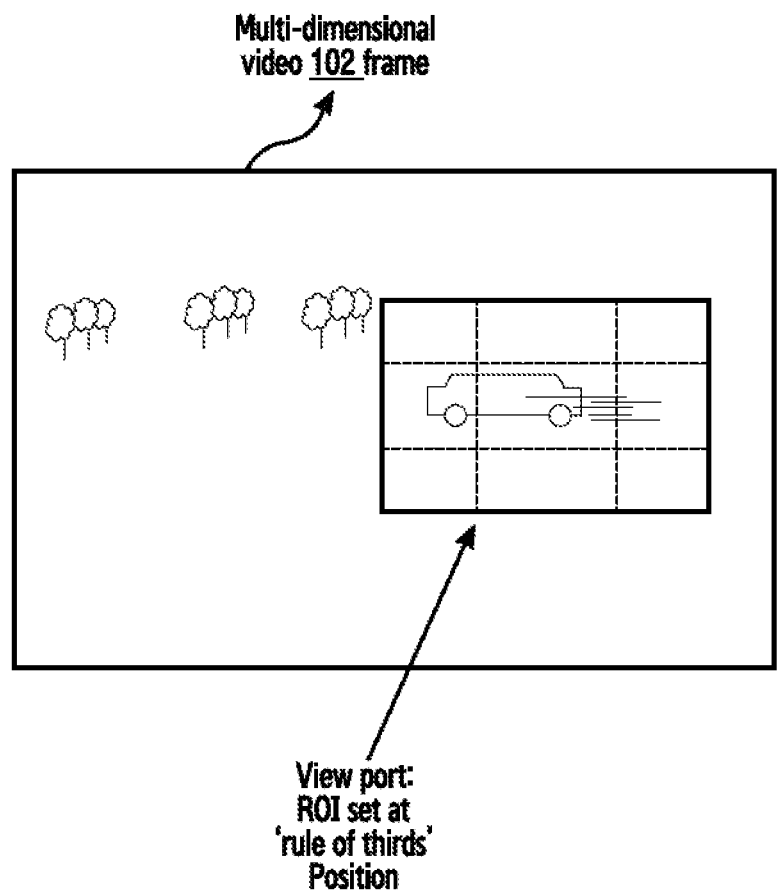
FIG. 5D is an example illustration of positioning at least one ROI (the related ROI's) in one or more second view ports according to an embodiment of the present disclosure.

Unlike the grouping of the ROI, as illustrated in FIG. 5B, the proposed mechanism computes, through the processor 302, the distance and similarities with the ROI, prior to perform the grouping of the ROI, as shown in FIG. 5C. As a result of grouping ROI (related ROI's), by computing the distance and similarities there between, in the second view port the positioning, as shown in FIG. 5D, of the ROI while viewing the multi-dimensional media 102, in the second view port, may be enhanced.

Figure 5E:
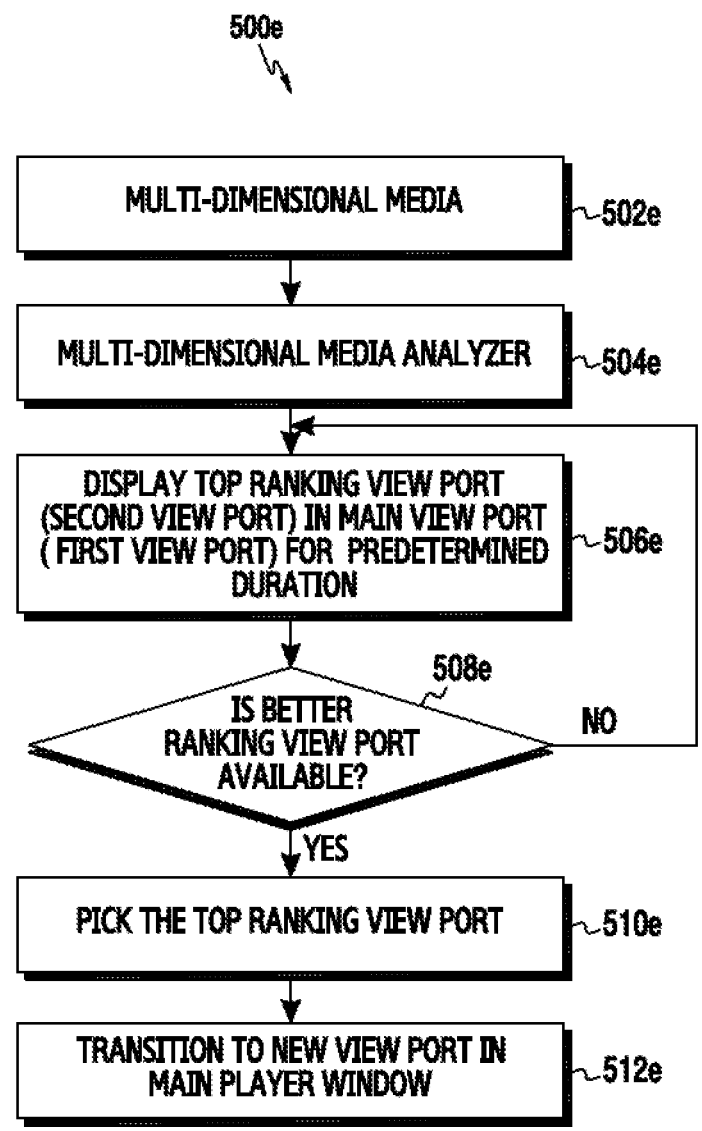
FIG. 5E is a flow diagram illustrating a method for arranging the one or more second view ports comprising at least one ROI based on a rank according to an embodiment of the present disclosure.

FIG. 5E is a flow diagram 500*e* illustrating a method for arranging the second view port comprising the ROI based on the rank according to an embodiment of the present disclosure.

At operation 502*e*, the method includes receiving the multi-dimensional media 102. In an embodiment, the method allows the processor 302 to receive the multi-dimensional media. At operation 504*e*, the method 800 includes analyzing the received multi-dimensional media 102 in the multi-dimensional media analyzer. In an embodiment, the method allows the processor 302 to analyze, through the multi-dimensional media analyzer coupled to the processor 302, to analyze the multi-dimensional media 102.

At operation 506*e*, the method includes displaying onto a screen 106 the first view port, comprising the highest rank (rank 1), for a predetermined duration. In an embodiment, the method allows the processor 302 to display, on the screen 106 associated with the display 304, the first view port, comprising the highest rank (rank 1), for the predetermined duration. At operation 508*e*, the method includes determining whether better ranking view port (second view port comprising the ROI) is available. In an embodiment, the method allows the processor 302 to determine whether better ranking view port is available. If the better ranking view port is not available, thereon, at operation 508*e*, the method includes displaying onto the screen 106 the first view port for a predetermined duration.

If the processor 302 determines that the better ranking view port is available, thereon, at operation 510*e*, the method includes picking the second view port (comprising the ROI). In an embodiment, the method allows the processor 302 to pick the picking the second view port.

At operation 512*e*, the method includes transitioning from the second view port to the first view port.

The various actions, acts, blocks, operations, or the like in the flow diagram 500*e* may be performed in the order presented, in a different order or simultaneously. Further, in some embodiments, some of the actions, acts, blocks, operations, or the like may be omitted, added, modified, skipped, or the like without departing from the scope of the present disclosure.

Figure 5F:
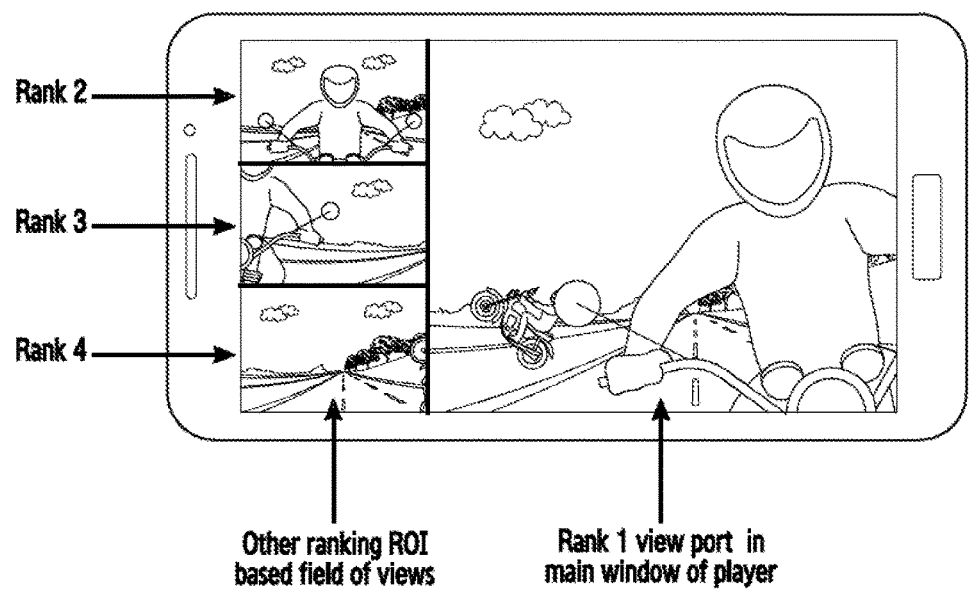
FIG. 5F is an example illustration of arranging the one or more second view ports based on the rank associated therewith according to an embodiment of the present disclosure.

FIG. 5F is an example illustration of arranging the first view port and the second view port based on the rank (e.g., ROI rank) associated therewith according to an embodiment of the present disclosure. In an embodiment of the present disclosure, the first view port of rank "1" (comprising the highest ROI ranking) may be displayed (in main window of a player) onto the screen 106 and the second view port of subsequent ranks (ranks "2-4", in video thumbnails) is displayed as shown in FIG. 5F.

Figure 5G:
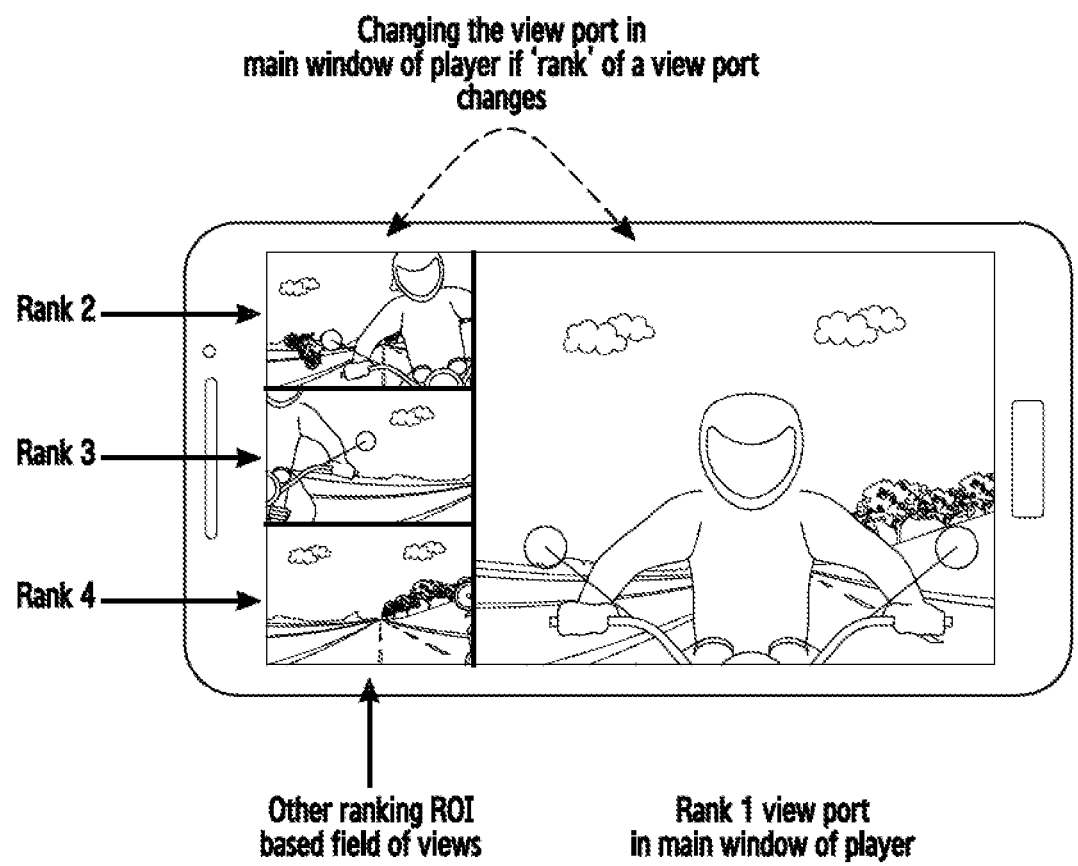
FIG. 5G is an example illustration of changing a highest rank view port to a first view port according to an embodiment of the present disclosure.

FIG. 5G is an example illustrating a transition between the first view port and the second view port based on the rank associated therewith according to an embodiment of the present disclosure.

If the rank associated with the first view port and the second view port changes, according to the proposed mechanism, the view port with highest rank "1" is displayed on to the main window of the screen 106.

Figure 6A:
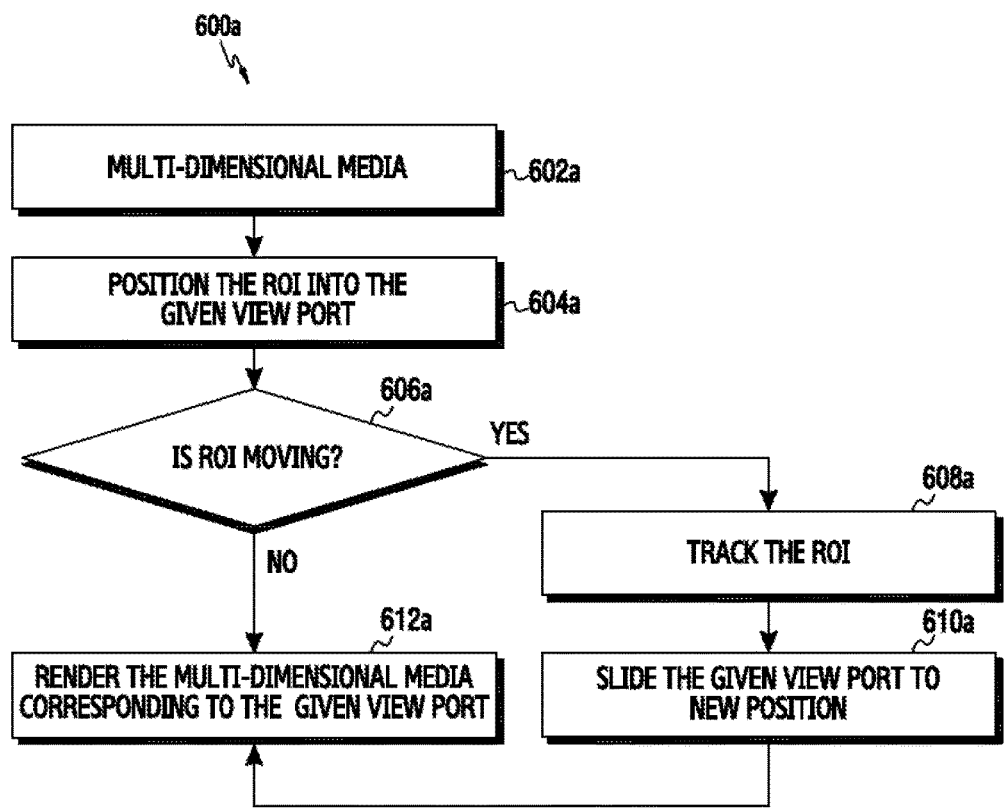
FIG. 6A is a flow diagram illustrating a method for tracking the moving ROI in one or more second view ports according to an embodiment of the present disclosure.

FIG. 6A is a flow diagram 600*a* illustrating a method for tracking the moving ROI in the second view port according to an embodiment of the present disclosure.

At operation 602*a*, the method includes receiving the multi-dimensional media 102 at an electronic device 100. Further, at operation 604*a*, the method includes positioning, through the processor 302, the ROI into the second view port (e.g., as per photographic rules). Further, at operation 606*a*, the method includes determining, by the processor 302, whether the ROI is moving. If the ROI is moving thereon, at operation 608*a*, the method includes tracking, by the processor 302, the ROI. Further, at operation 610*a*, the method includes sliding, by the processor 302, the second view port to new position (e.g., first view port) such that the ROI in view port is as per photographic rules. If the ROI, detected by the processor 302, is not moving thereon, at operation 612*a*, the method includes rendering, onto the screen 106 coupled to the processor 302, the multi-dimensional media 102 corresponding to the second view port.

The various actions, acts, blocks, operations, or the like in the flow diagram 600*a* may be performed in the order presented, in a different order or simultaneously. Further, in some embodiments of the present disclosure, some of the actions, acts, blocks, operations, or the like may be omitted, added, modified, skipped, or the like without departing from the scope of the present disclosure.

Figure 6B:
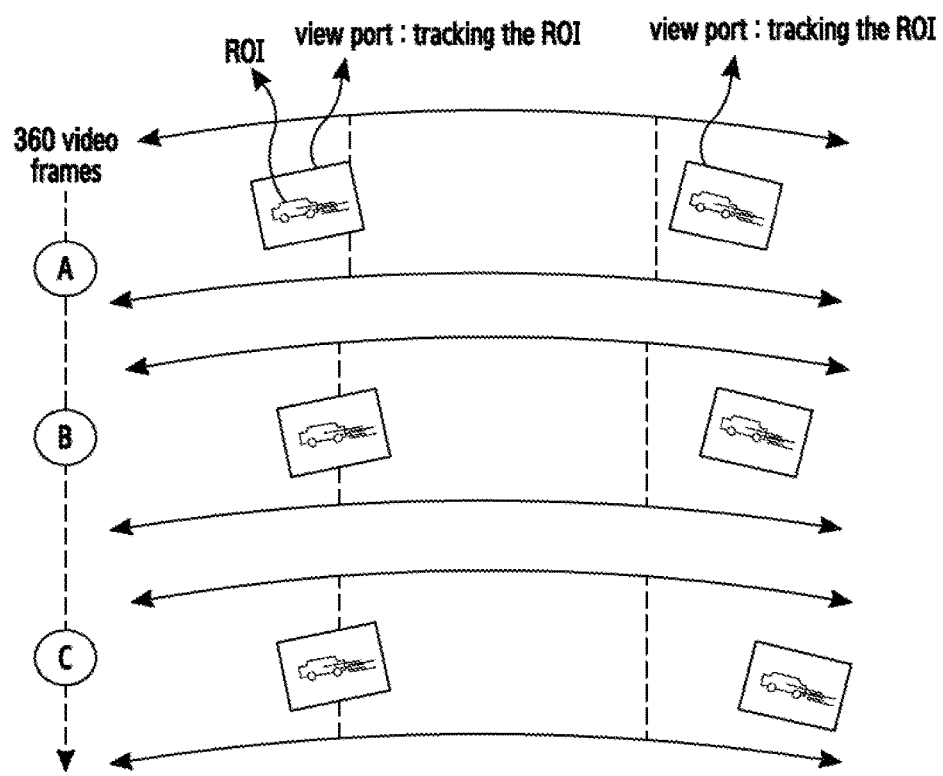
FIG. 6B is an example illustration for tracking the ROI in one or more second view ports according to an embodiment of the present disclosure.

FIG. 6B is an example illustration for tracking the ROI in the second view port according to an embodiment of the present disclosure.

In an embodiment of the present disclosure, the second view port comprising the ROI (associated with the multi-dimensional media 102) is tracked by the processor 302. As the ROI in the second view port varies the position of the second view port, also varies, as shown in FIG. 6B.

Figure 7A:
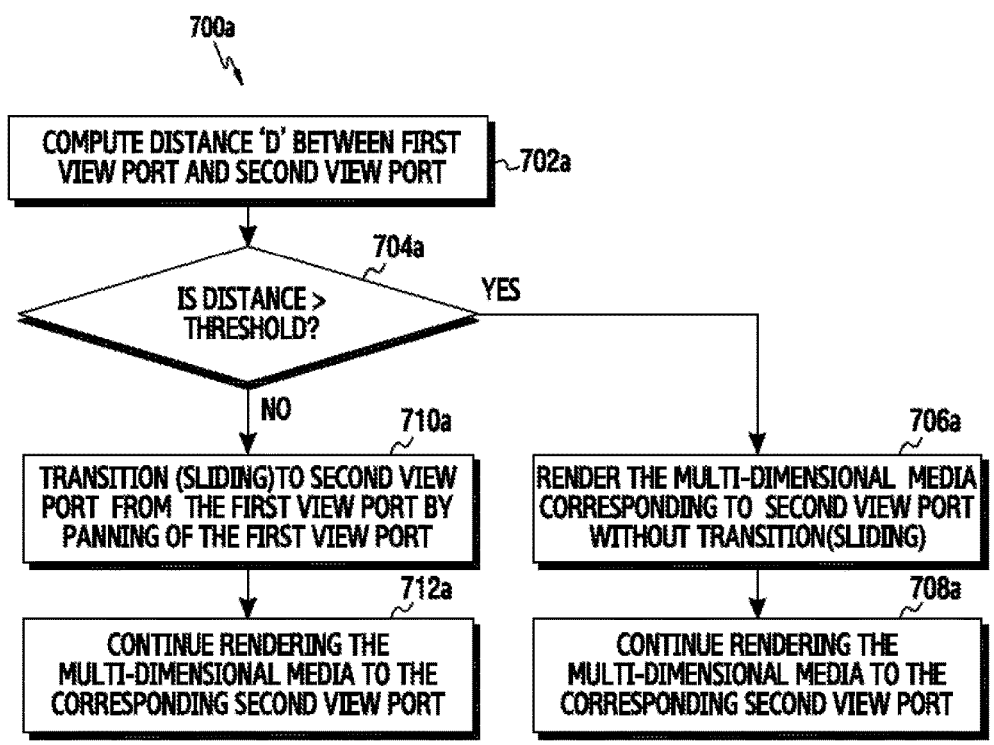
FIG. 7A is a flow diagram illustrating a method for automatically computing a shortest path between a first view port and one or more second view ports according to an embodiment of the present disclosure.

FIG. 7A is a flow diagram 700*a* illustrating a method for automatically computing a shortest path between the first view port and the second view port according to an embodiment of the present disclosure.

At operation 702*a*, the method includes computing, through the processor 302, the distance 'D' between the first view port and the second view port. Further, at operation 704*a*, the method includes determining, by the processor 302, whether the "D" is greater than threshold. If the processor 302 determines that the "D" exceeds the threshold thereon, at operation 706*a*, the method includes rendering, onto the screen 106 couple to the processor 302, the multi-dimensional media 102 corresponding to the second view port without transition (sliding). Further, at operation 708a, the method includes to continue rendering the multi-dimensional media 102 corresponding to the second view port.

Further, if the processor 302 determines that the "D" is within the threshold thereon, at operation 710a, the method includes transitioning (sliding), by the processor 302, to the second view port from the first view port by panning the first view port. Further, at operation 712a, the method continues rendering the multi-dimensional media 102 corresponding to the second view port.

The various actions, acts, blocks, operations, or the like in the flow diagram 700a may be performed in the order presented, in a different order or simultaneously. Further, in some embodiments, some of the actions, acts, blocks, operations, or the like may be omitted, added, modified, skipped, or the like without departing from the scope of the present disclosure FIG. 7B is an example illustration for automatically computing a shortest path between the first view port and the second view port according to an embodiment of the present disclosure.

Figure 7B:
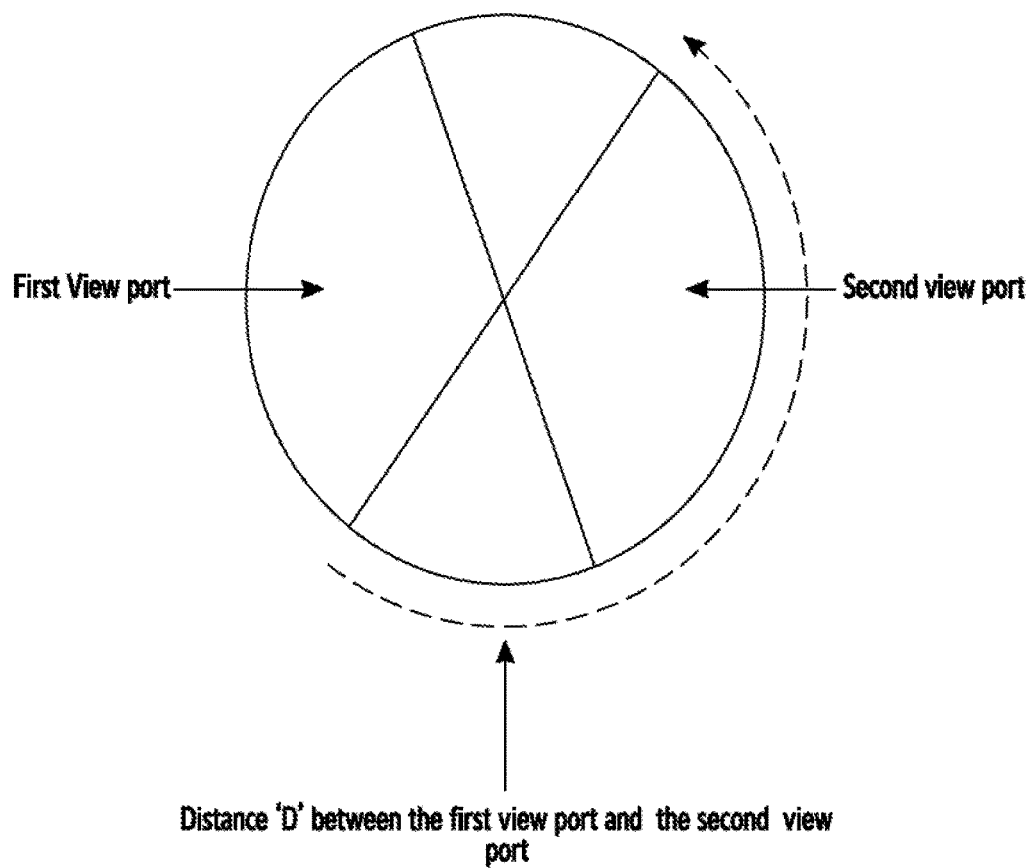
FIG. 7B is an example illustration for automatically computing a shortest path between a first view port and one or more second view ports according to an embodiment of the present disclosure.

Referring to FIG. 7B, if distance 'D' is too high, e.g., greater than 60 degrees, then the transition (sliding) may take a long time, as a result, the processor 302 may be configured to perform switching from the first view port to the second view port.

Figure 8A:
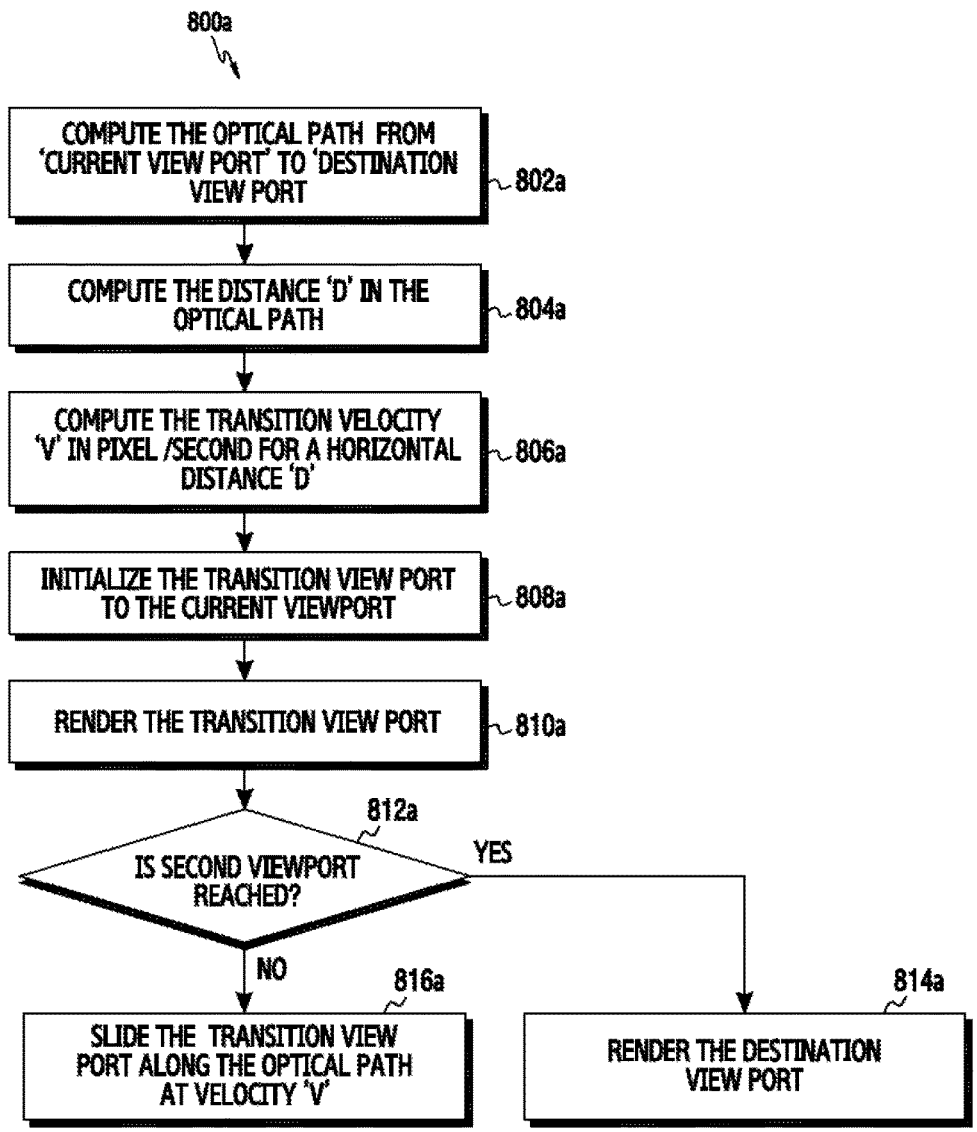
FIG. 8A is a flow diagram illustrating a method for computing a transition path and a transition velocity between a first view port and one or more second view ports according to an embodiment of the present disclosure.

FIG. 8A is a flow diagram 800a illustrating a method for computing the transition path and the transition velocity between the first view port and the second view port according to an embodiment of the present disclosure.

At operation 802a, the method includes computing, by the processor 302, the distance "D" between the first view port and the second view port during transition. Further, at operation 804a, the method includes computing, by the processor 302, the distance 'D', from the first view port and the second view port, in the optical path. Further, at operation 806a, the method includes computing, by the processor 302, the transition velocity 'V' in pixel/second for the horizontal distance 'D' computed between the first view port and the second view port.

Further, at operation 808a, the method includes initializing, by the processor 302, a transition view port to the second view port, on to the main window of the player (e.g., first view port). Further, at operation 810a, the method includes rendering the transition view port. Further, at operation 812a, the method includes determining, by the processor 302, whether the second view port, comprising the ROI, is reached. If the second view port is reached thereon, at operation 814a, the method 814a includes rendering, onto the screen 106, the second view port. If the second view port is not reached thereon, at operation 816a, the method includes sliding, by the processor 302, the transition view port along the optical path at the velocity 'V'.

The various actions, acts, blocks, operations, or the like in the flow diagram 800a may be performed in the order presented, in a different order or simultaneously. Further, in some embodiments, some of the actions, acts, blocks, operations, or the like may be omitted, added, modified, skipped, or the like without departing from the scope of the present disclosure.

Figure 8B:
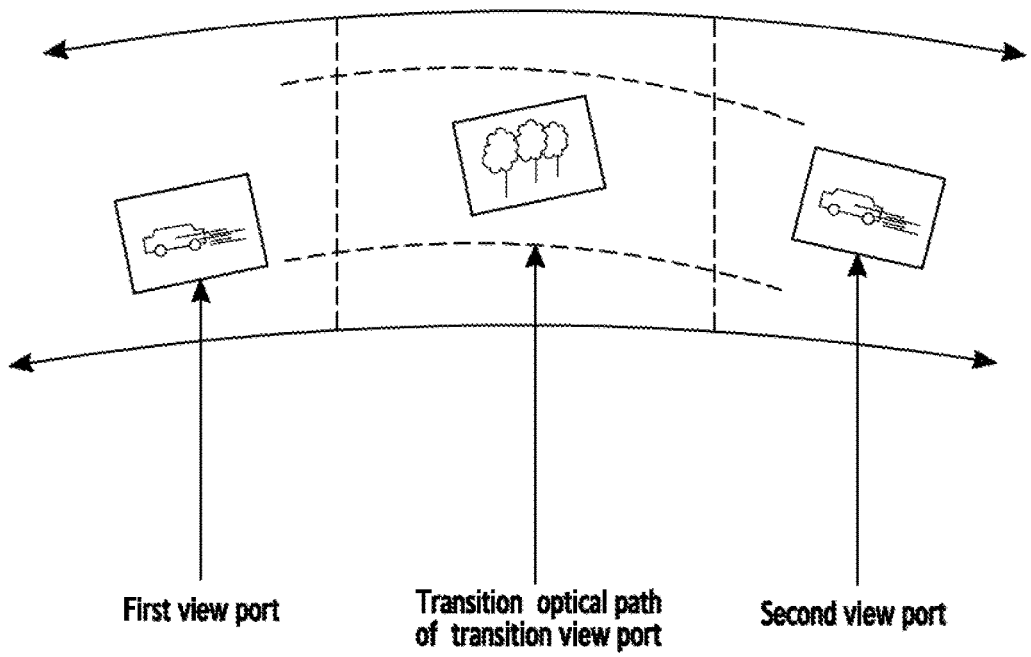
FIG. 8B is an example illustration for computing a transition path and a transition velocity between a first view port and one or more second view ports according to an embodiment of the present disclosure.

FIG. 8B is an example illustration for computing the transition path and the transition velocity between the first view port and the second view port according to an embodiment of the present disclosure.

In an embodiment of the present disclosure, the distance between the first view port and the second view port may be computed, by the processor 302, to determine the transition path and transition velocity. Further, the first view port may initialize the transition to the second view port through the transition path, with the transition velocity determined by the processor 302, as shown in FIG. 8B. Further, the processor 302 may be configured to render the second view port comprising the ROI.

Figure 9:
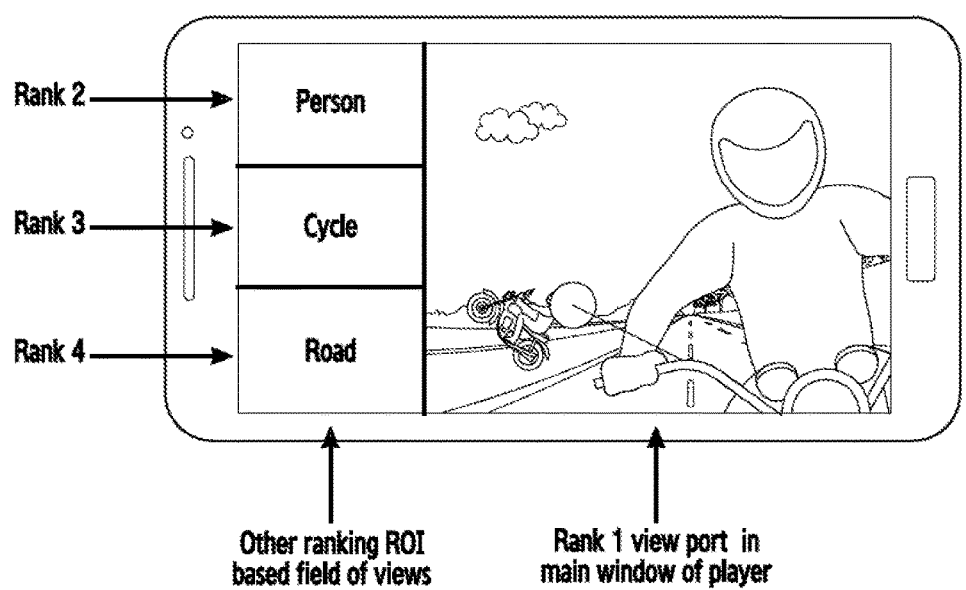
FIG. 9 is an example illustration of detecting ROI based on one or more user personalization and identification parameters according to an embodiment of the present disclosure.

FIG. 9 is an example illustration of detecting ROI based on one or more user personalization and identification parameters (analogous to user defined parameters) according to an embodiment of the present disclosure.

In an embodiment of the present disclosure, the user of the electronic device 100 may set ROI, using video annotation engine coupled to the processor 302, in the multi-dimensional media 102. For example, if the user may wish to view the activities involved by the user-2 (person) the user can simply set, through the processor 302, an input thereon the processor 302 coupled to the video annotation engine may rank (for example, rank 1-4) the ROI according to the user personalization. The rank-1 view port is displayed in the main window of the player (as shown in FIG. 9) and other ranking ROI (subsequent) may be displayed onto the screen (for example, as video thumbnails) as shown in FIG. 9.

In an embodiment of the present disclosure, if the user may wish to identify the biking action performed by the biker at a given instant of time for particular duration, the processor 302 thereof (post input from the user) may automatically identify the user interestingness portion (biking action) in the multi-dimensional media 102 thereon rank and arranged the view port (second view port) accordingly.

For example, if the quantitative score (i.e., ranking) of the video segment "A" measured by the processor 302 is higher than that of the video segment "B", according to the proposed mechanism the multimedia processing unit can be configured to automatically display the content of the video segment "A".

The user of the electronic device 100 may still be able to view the video segment "B" by manually navigating (i.e., scrolling/swiping) the current field of view, the first view port, of the multi-dimensional media 102.

Figure 10A:
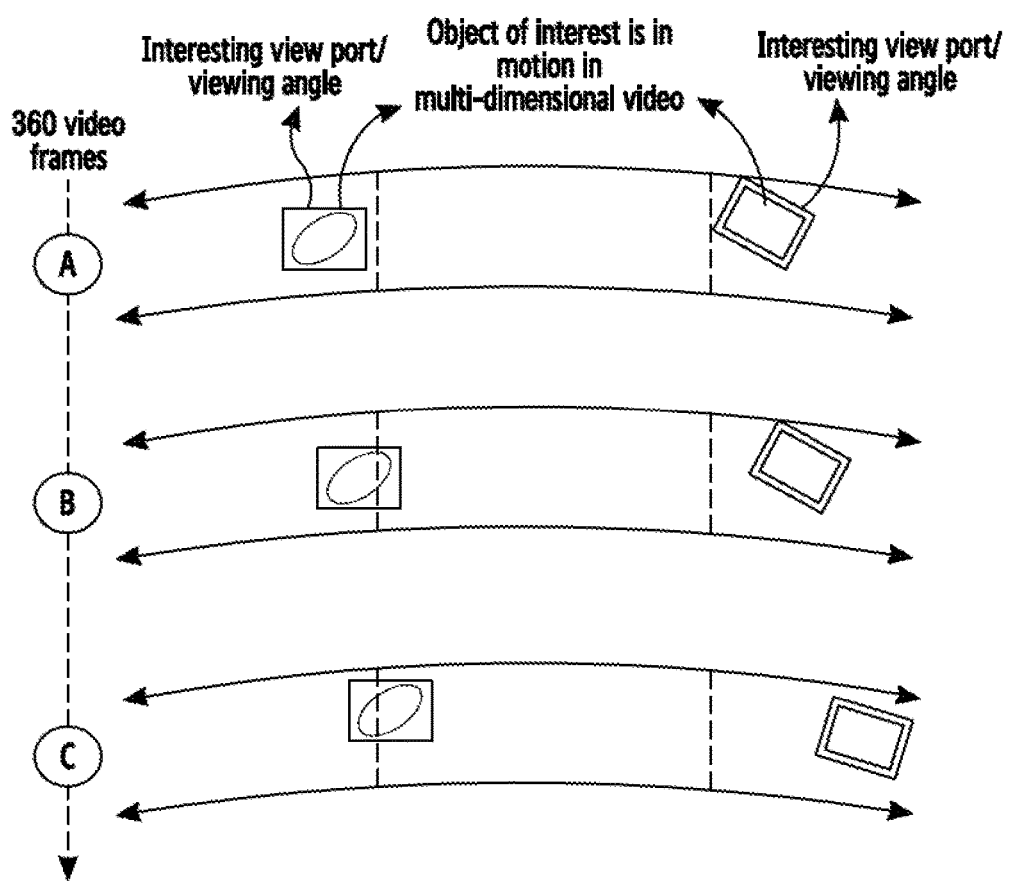
FIG. 10A is an example illustrating a method for tracking two different objects in motion according to an embodiment of the present disclosure.

In an embodiment of the present disclosure, for example, the number and location of the second view port comprising the ROI can be varied as video progresses (as shown in FIG. 10A), conversely the number and the location of the second view port comprising the ROI in the panorama image is fixed, same rendered onto the screen 104. Further, the rank/score/weight of the second view port comprising the ROI in the multi-dimensional media 102, can be varied as the video progresses; based on the salient content of the first view port, conversely the rank/score/weight of the second view port comprising the ROI, in the panorama image, is fixed.

Figure 10B:
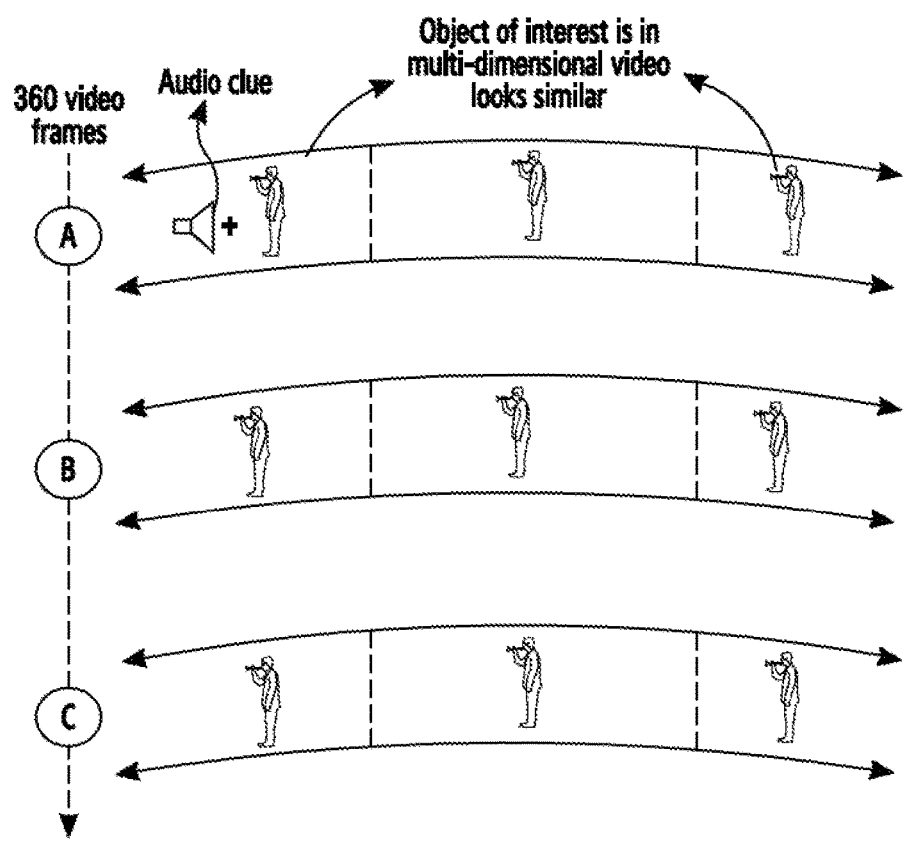
FIG. 10B is an example illustrating an audio provision for detecting related ROI's in a multi-dimensional video according to an embodiment of the present disclosure.

Similarly, when the ROI (the related ROI's) in the second view port are identical (or, similar), the audio clues and directionality information may be provided to identify the ROI (as shown in FIG. 10B). Conversely, the audio clues provision is not available for detecting the ROI (the related ROI's) associated with the panorama image.

Furthermore, the illustration of the temporal aspect (time aspect) i.e., the multi-dimensional media 102 scene in a given field of view spans for a certain duration is decided by the processor 302, conversely, no temporal/time aspect are available for the panorama image consequently the rank and location of the second view port, of the panorama image is fixed.

Figure 11:
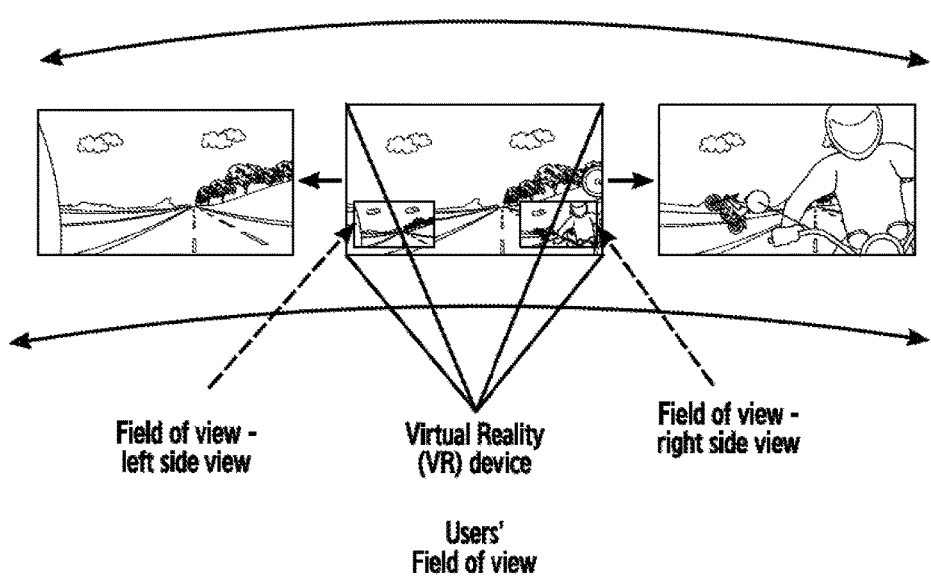
FIG. 11 is an example illustrating the viewing angle, corresponding to the first view port and the second view port, to the user applying the virtual reality (VR) device thereof according to an embodiment of the present disclosure.

FIG. 11 is an example illustrating the viewing angle, corresponding to the first view port and the second view port, to the user applying the VR device thereof according to an embodiment of the present disclosure.

Unlike the systems and method of the related art (as detailed in FIG. 2B) the proposed mechanism automatically, through the processor 302, cause to display the other view ports (e.g., get an idea of what is happening in other field of views comprising the multi-dimensional media 102 facilitating the user to select any one of the view port from the other view ports, displayed on to the screen 104.

Figure 12:
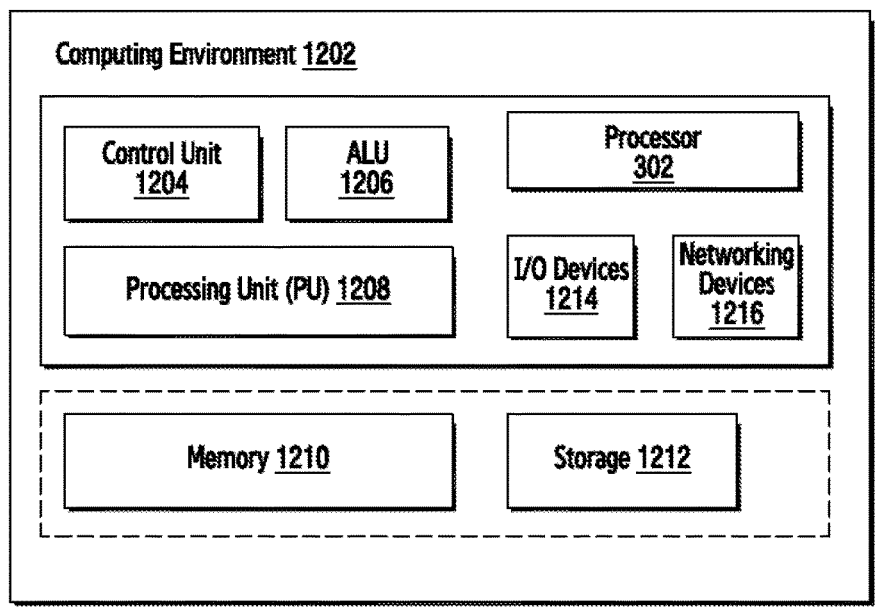
FIG. 12 illustrates a computing environment implementing the method and system for automatically displaying the indication in the multi-dimensional media in an electronic device according to an embodiment of the present disclosure.

FIG. 12 illustrates a computing environment implementing the method for automatically displaying the indication 202 in the multi-dimensional media 102 in the electronic device 100 according to various embodiments of the present disclosure.

Referring to FIG. 12, a computing environment 1202 may comprise at least one processing unit 1208 that is equipped with a control unit 1204 and an arithmetic logic unit (ALU) 1206, a memory 1210, a storage 1212, a processor 302, a plurality of networking devices 1216 and a plurality input output (I/O) devices 1214. The processing unit 1208 is responsible for processing the instructions of the schemes. The processing unit 1208 receives commands from the control unit in order to perform its processing. Further, any logical and arithmetic operations involved in the execution of the instructions are computed with the help of the ALU 1206.

The computing environment 1202 can be composed of multiple homogeneous or heterogeneous cores, multiple CPUs of different kinds, special media and other accelerators. The processing unit 1208 is responsible for processing the instructions of the schemes. Further, a plurality of processing units may be located on a single chip or over multiple chips.

The scheme comprising of instructions and codes required for the implementation are stored in either the memory 1210 or the storage 1212 or both. At the time of execution, the instructions may be fetched from the corresponding memory 1210 or storage 1212, and executed by the processing unit 1208.

In case of any hardware implementations, various networking devices, such as the plurality of networking devices 1216 or external I/O devices (such as the input output (I/O) devices 1214) may be connected to the computing environment to support the implementation through the networking unit and the I/O device unit. a plurality input output (I/O) devices The embodiments disclosed herein can be implemented through at least one software program running on at least one hardware device and performing network management functions to control the elements. The elements shown in FIGS. 2A to 2C, 3, 4A to 4K, 5A to 5G, 6A and 6B, 7A and 7B, 8A and 8B, 9, 10A and 10B, 11, and 12 include blocks which can be at least one of a hardware device, or a combination of hardware device and software units.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for use in an electronic device, the method comprising:
receiving an image data of a multi-dimensional media comprising at least one of 360 degrees video, three-dimensional (3D) video, 360 degrees image or 3D image;
controlling a display to display a first field of view of the image data on the display;
determining at least one region of interest (ROI) in at least one second field of view of the image data; and
controlling the display to provide an indication aiding a user to navigate towards a direction of the at least one second field of view comprising the at least one ROI from the first field of view of the image data.

2. The method of claim 1, further comprising:
controlling the display to automatically display the at least one second field of view of the image data by replacing the first field of view of the image data.

3. The method of claim 1, further comprising:
controlling the display to display the at least one second field of view of the image data with the first field of view of the image data.

4. The method of claim 3, wherein the at least one second field of view is displayed in an ordering based on a ranking of the at least one second field of view.

5. The method of claim 4, wherein the at least one second field of view is displayed by replacing the first field of view based on a change of the ranking.

6. The method of claim 1,
wherein the indication comprises at least one of a visual indication, an audio indication, a thumbnail, and
wherein the thumbnail comprises the at least one region of interest (ROI).

7. The method of claim 1, further comprising:
extracting a plurality of features from the image data; and
determining the at least one ROI based on the plurality of features,
wherein the plurality of features comprises at least one of face attributes, motion attributes, aesthetic attributes, saliency attributes, and audio attributes.

8. The method of claim 1, further comprising:
grouping the at least one RIO based on at least one of distance and similarity with the at least one ROI,
wherein the at least one second field of view is determined to comprise the grouped at least one ROI.

9. The method of claim 1, further comprising:
if the at least one ROI moves along the image data, updating the at least one second field of view to comprise the moving ROI by tracking the at least one ROI.

10. The method of claim 1, further comprising:
receiving an input to navigate from the first field of view to the at least one second field of view;
if a distance between the first field of view and the at least one second field of view is within a threshold, performing a seamless transition from the first field of view to the at least one second field of view; and
if the distance exceeds the threshold, rendering the at least one second field of view without the seamless transition.

11. An electronic device comprising:
a display;
at least one transceiver configured to receive an image data of a multi-dimensional media comprising at least one of 360 degrees video, three-dimensional (3D) video, 360 degrees image or 3D image; and
at least one computer processor, operatively coupled to the at least one transceiver,
wherein the at least one computer processor is configured to:
control the display to display a first field of view of the image data on the display;

determine at least one region of interest (ROI) in at least one second field of view of the image data, and control the display to provide an indication aiding a user to navigate towards a direction of the at least one second field of view comprising the at least one ROI from the first field of view of the image data.

12. The electronic device of claim 11, wherein the at least one computer processor is further configured to control the display to automatically display the at least one second field of view of the image data by replacing the first field of view of the image data.

13. The electronic device of claim 11, wherein the at least one computer processor is further configured to control the display to display the at least one second field of view of the image data with the first field of view of the image data.

14. The electronic device of claim 13, wherein the at least one second field of view is displayed in an ordering based on a ranking of the at least one second field of view.

15. The electronic device of claim 14, wherein the at least one second field of view is displayed by replacing the first field of view based on a change of the ranking.

16. The electronic device of claim 11, wherein the indication comprises at least one of a visual indication, an audio indication, a thumbnail comprising the at least one ROI.

17. The electronic device of claim 11, wherein the at least one computer processor is further configured to:

extract a plurality of features from the image data; and
determine the at least one RIO based on the plurality of features,
wherein the plurality of features comprise at least one of face attributes, motion attributes, aesthetic attributes, saliency attributes, and audio attributes.

18. The electronic device of claim 11, wherein the at least one computer processor is further configured to:

group the at least one ROI based on at least one of distance and similarity with the at least one ROI,
wherein the at least one second field of view is determined to comprise the grouped at least one ROI.

19. The electronic device of claim 11, wherein, if the at least one ROI moves along the image data, the at least one computer processor is further configured to update the at least one second field of view to comprise the moving ROI by tracking the at least one ROI.

20. The electronic device of claim 11, wherein the at least one computer processor is further configured to:

receive an input to navigate from the first field of view to the at least one second field of view;
if a distance between the first field of view and the at least one second field of view is within a threshold, perform a seamless transition from the first field of view to the at least one second field of view; and
if the distance exceeds the threshold, render the at least one second field of view without the seamless transition.

* * * * *